(12) United States Patent
Matsumoto

(10) Patent No.: US 7,830,444 B2
(45) Date of Patent: Nov. 9, 2010

(54) IMAGE CAPTURING APPARATUS

(75) Inventor: Toshio Matsumoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 12/025,444

(22) Filed: Feb. 4, 2008

(65) Prior Publication Data

US 2008/0259200 A1    Oct. 23, 2008

(30) Foreign Application Priority Data

Feb. 16, 2007    (JP) ............................. 2007-036813

(51) Int. Cl.
- H04N 5/225    (2006.01)
- H04N 5/228    (2006.01)
- H04N 5/335    (2006.01)

(52) U.S. Cl. .................. 348/340; 348/208.11; 348/296

(58) Field of Classification Search ................. 348/340, 348/246, 335, 208.11, 296
See application file for complete search history.

(56) References Cited

U.S. PATENT DOCUMENTS

| | | | | |
|---|---|---|---|---|
| 7,215,372 | B2 * | 5/2007 | Ito et al. ...................... | 348/340 |
| 7,280,145 | B2 * | 10/2007 | Takizawa et al. ............ | 348/340 |
| 7,365,788 | B2 * | 4/2008 | Ito .............................. | 348/335 |
| 7,609,315 | B2 * | 10/2009 | Kawai ......................... | 348/340 |
| 7,639,301 | B2 * | 12/2009 | Niwamae et al. ............ | 348/335 |
| 7,705,906 | B2 * | 4/2010 | Watanabe .................... | 348/340 |
| 7,724,299 | B2 * | 5/2010 | Kawai ......................... | 348/340 |
| 2004/0012714 | A1 | 1/2004 | Kawai | |
| 2004/0227837 | A1 | 11/2004 | Ito | |
| 2005/0052759 | A1 | 3/2005 | Ito et al. | |
| 2006/0207290 | A1 | 9/2006 | Ide et al. | |

FOREIGN PATENT DOCUMENTS

| | | |
|---|---|---|
| CN | 1834773 A | 9/2006 |
| JP | 08-079633 A | 3/1996 |
| JP | 2002-204379 | 7/2002 |

OTHER PUBLICATIONS

The above references were cited in a Jul. 3, 2009 Chinese Office Action that issued in Chinese Patent Application No. 200810006160.1, which is enclosed with English Translation.
All of the above references were cited in a Jun. 11, 2008 European Search Report (copy enclosed) of the counterpart European Patent Application 08151492.9.

* cited by examiner

Primary Examiner—Lin Ye
Assistant Examiner—Trung Diep
(74) Attorney, Agent, or Firm—Cowan, Liebowitz & Latman, P.C.

(57) ABSTRACT

The present invention further improves foreign substance removal performance when removing foreign substances such as dust that adhere to the surface of an optical element disposed in front of an image sensor. The image capturing apparatus includes an image sensor that performs photo-electric conversion of an optical image of an object formed by a photographing optical system, an optical element disposed between the photographing optical system and the image sensor, a shutter disposed between the photographing optical system and the optical element and having shutter curtains capable of traveling between an open state and a closed state, a first vibration device that causes the optical element to vibrate, a second vibration device that causes the shutter curtains to vibrate, and a control device that controls operations of the first vibration device and second vibration device.

4 Claims, 32 Drawing Sheets

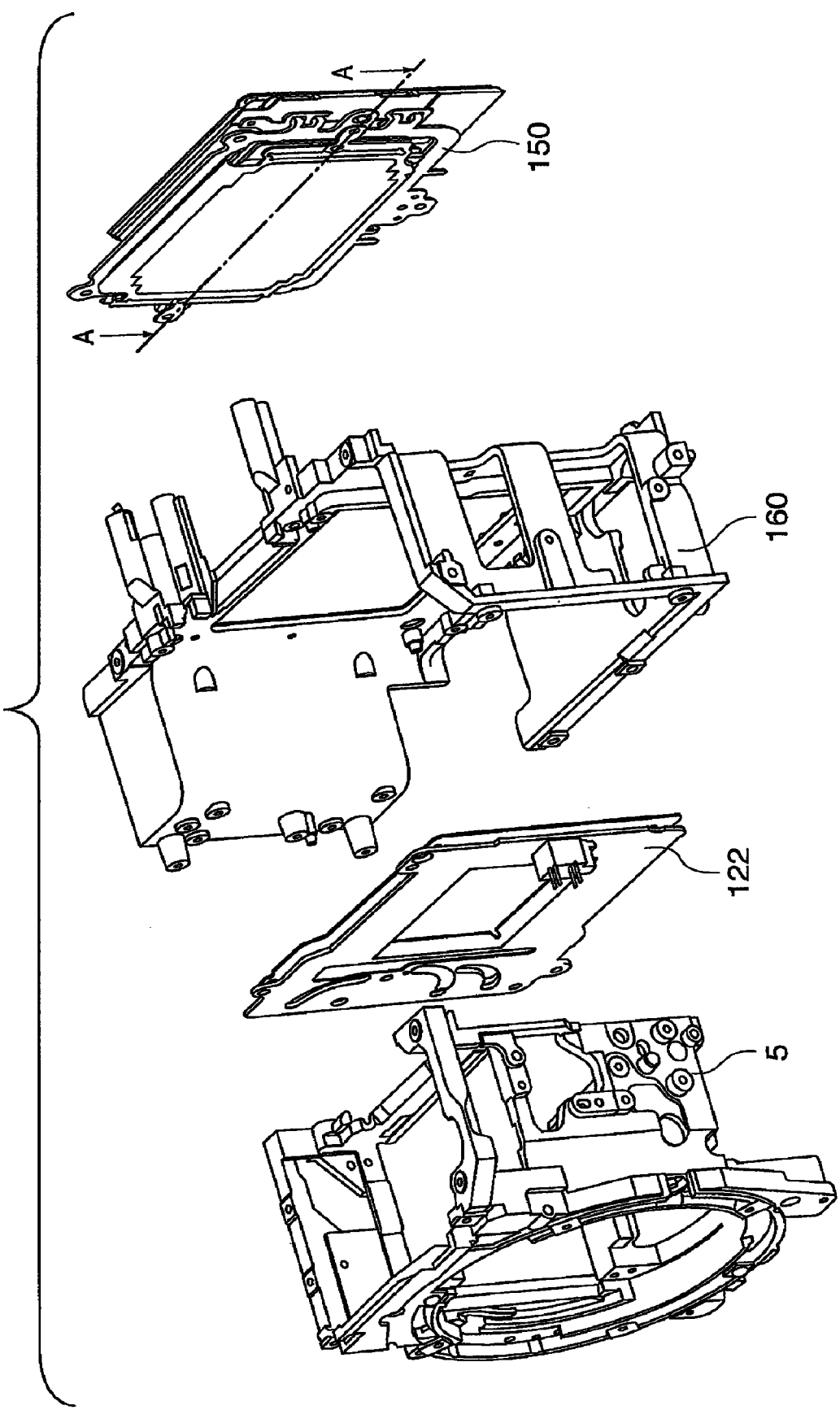

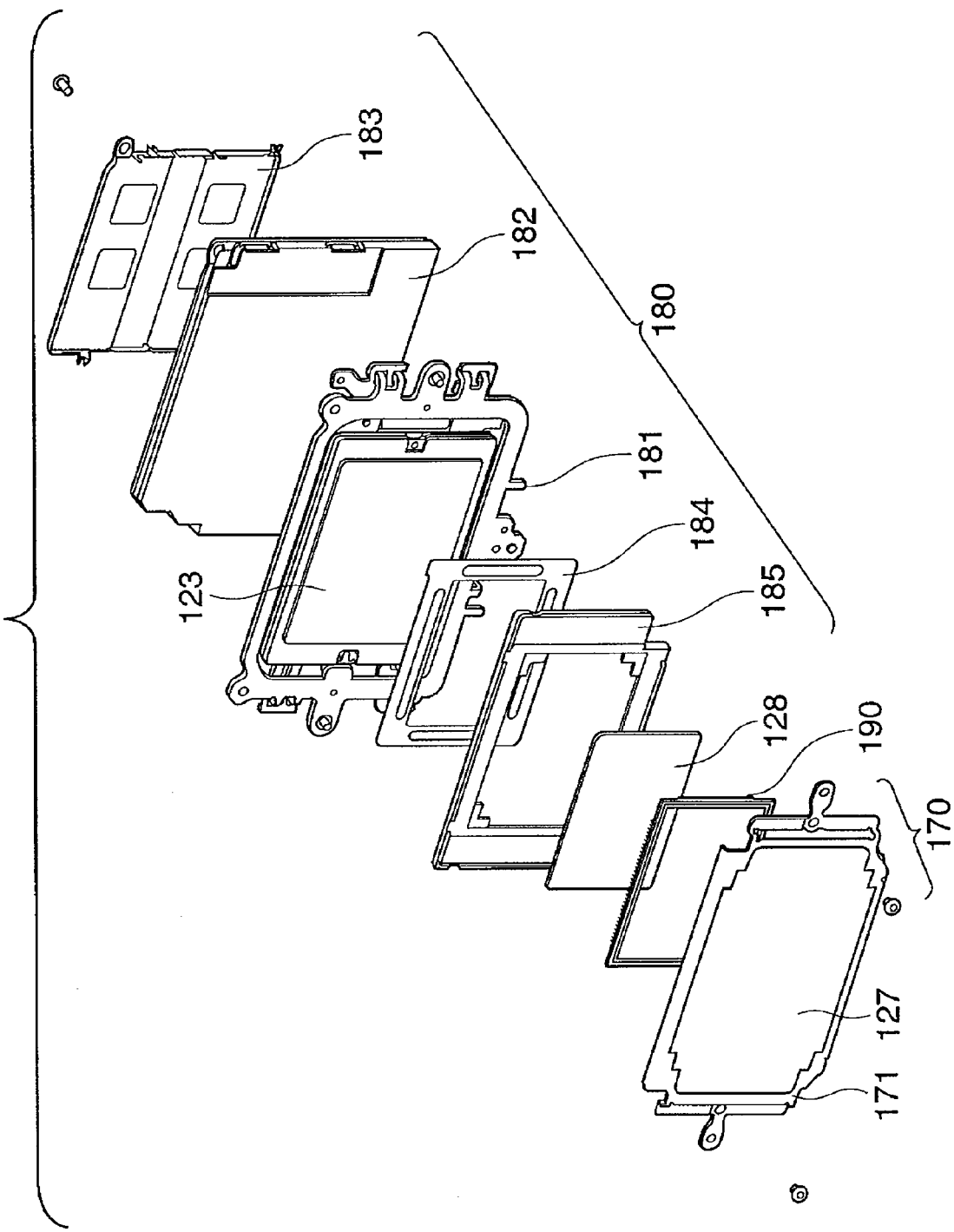

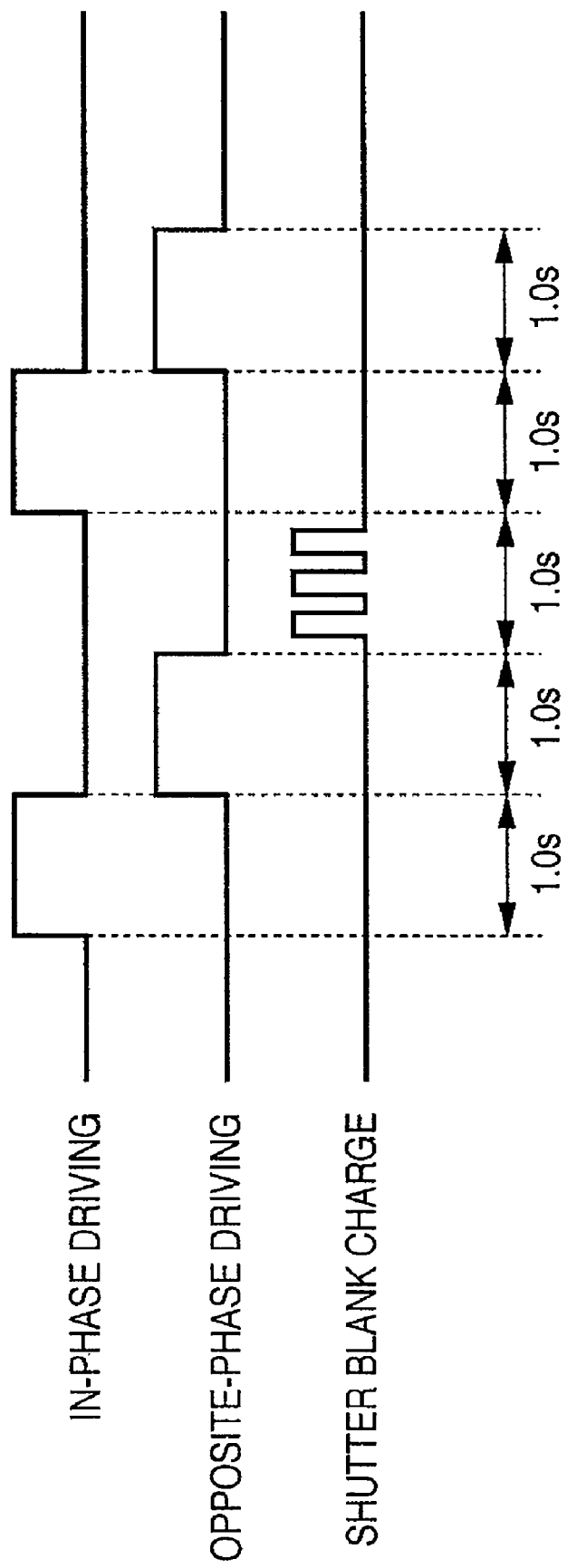

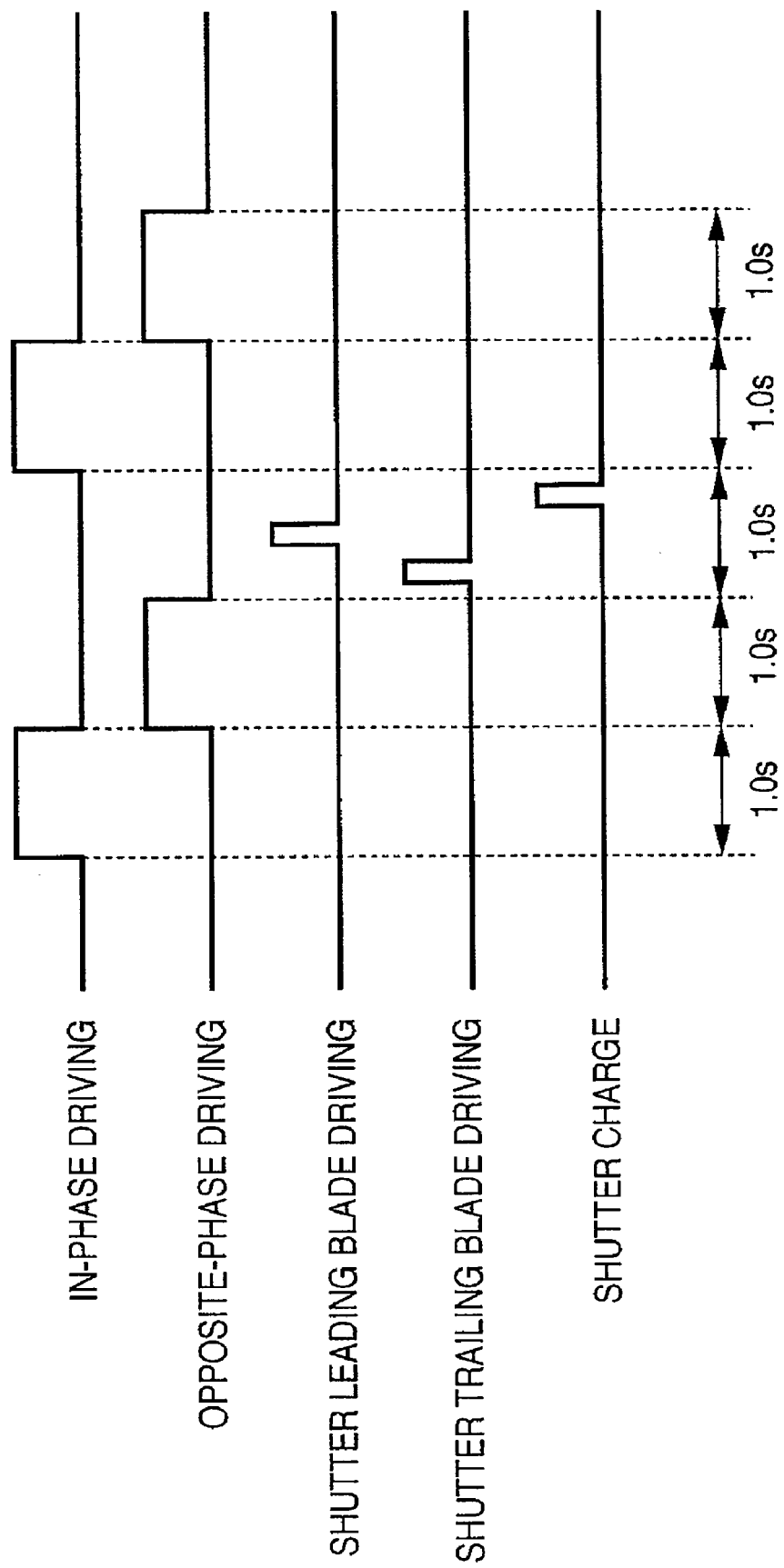

IMAGE CAPTURING APPARATUS

BACKGROUND OF THE INVENTION

1. Field of the Invention

The present invention relates to technology that removes foreign substances that adhere to an optical member provided at the front of an image sensor and the periphery thereof in an image capturing apparatus such as a digital camera.

2. Description of the Related Art

An image capturing apparatus such as a digital camera that captures an image by converting an image signal into an electrical signal receives a photographing light beam with an image sensor, converts a photo-electric conversion signal that is output from the image sensor into image data, and records the image data on a recording medium such as a memory card. A CCD (Charge Coupled Device) or a C-MOS (Complementary Metal Oxide Semiconductor) or the like is typically used as an image sensor.

In this kind of image capturing apparatus, an optical element such as an optical low pass filter (hereunder, referred to as "LPF") or an infrared cut-off filter is often disposed between a photographing lens and an image sensor. If a foreign substance such as dust adheres to the cover glass of the image sensor or to the surface of these optical elements, the shadow of that foreign substance will be transferred onto the solid-state image sensor.

These kinds of foreign substances are in fact very minute particles measuring less that several tens of μm. It is considered that the foreign substances are caused by dust or the like entering the camera from outside when changing the lens, or by the generation by abrasion (accompanying operation of the shutter or mirror inside the camera) of powder from resin or the like that is a structural member of the camera interior.

There are cases in which, in particular, dust generated by these kinds of causes penetrates into the area between a protective cover glass of the solid-state image sensor and an infrared cut-off filter or LPF or the like disposed in front of the cover glass. In such cases, the camera must be disassembled in order to remove the dust. It is therefore extremely desirable to adopt a sealed structure in order to prevent dust penetrating between the cover glass of the solid-state image sensor and an optical filter.

However, when dust adheres to the surface of a side facing a solid-state image sensor of an optical filter as well as an opposite side, it is difficult to remove the dust since the dust is very small. Further, when the position at which the dust adheres is in the vicinity of the focal plane, the problem remains that the dust forms a shadow that is clearly reflected on the solid-state image sensor.

In particular, in recent years the trend of capturing images that have a large number of pixels is also proceeding in the field of lens-interchangeable single-lens reflex digital cameras, and 135 format cameras of this type are commercially available in the 10 million pixel class. As high definition images are obtainable accompanying this trend towards capturing images that have a large number of pixels, demand is increasing from users who wish to enlarge the display of captured high resolution images to check the images. Since the shadows of foreign substances are all the more conspicuous when a user performs this kind of enlarged display, foreign substances that adhere to the vicinity of the focal plane of the photographing lens are being seen as more of a problem than in the past.

In particular, in single-lens reflex digital cameras in which it is possible to exchange lenses, mechanical operating units such as shutters and quick return mirrors are disposed in the vicinity of the image sensor. Foreign substances such as dust generated by these operating units sometimes adheres to the image sensor or to a low pass filter. Dust or the like can also enter inside the camera main unit through the lens mount opening when exchanging lenses.

In order to solve this problem, Japanese Patent Laid-Open No. 2002-204379 discloses a single-lens reflex digital camera having a photographing optical system that forms an optical image of an object, a photo-electric conversion element that converts the optical image into an electrical signal, an optical element that is disposed between the photographing optical system and the photo-electric conversion element, and a vibration means comprising a piezo-electric element that causes the optical element to vibrate. By causing the optical element to vibrate using the piezo-electric element, a foreign substance such as dust particles that adheres to the surface of the optical element can be removed.

The single-lens reflex digital camera disclosed in Japanese Patent Laid-Open No. 2002-204379 is configured to remove dust or the like that adheres to the surface on the photographing lens side of the optical element that is disposed at the front surface of the photo-electric conversion element by causing it to fly off the optical element surface by vibrating the optical element using the vibration means. However, since a shutter is normally provided close to the front surface of the optical element in a single-lens reflex digital camera, some dust or the like that is knocked off the optical element reattaches to the surface of a group of shutter blades of the shutter that cover the optical element front surface.

When an exposure operation starts in this state, there is a possibility that the dust or the like that is adhered to the surface of the group of shutter blades will be knocked off from that surface when the shutter blades are driven, and will again adhere to the optical element surface. There is thus the problem that in some cases removal of dust from the optical element surface is incomplete.

SUMMARY OF THE INVENTION

Accordingly, it is desirable to further improve foreign substance removal performance in a case of removing a foreign substance such as dust that adheres to the surface of an optical element that is disposed in front of an image sensor.

According to a first aspect of the present invention, there is provided an image capturing apparatus comprising a photographing optical system, an image sensor operable to capture an image of an object formed by the photographing optical system, an optical element disposed between said photographing optical system and said image sensor, a shutter disposed between said photographing optical system and said optical element and which has one or more shutter curtains that are capable of traveling between an open state and a closed state, a first vibration unit operable to cause said optical element to vibrate, a second vibration unit operable to cause said one or more shutter curtains to vibrate, and a controller configured to control the timing of the operation of said first vibration unit and said second vibration unit.

According to a second aspect of the present invention, there is provided an image capturing apparatus comprising a photographing optical system, an image sensor operable to capture an image of an object formed by the photographing optical system, an optical element disposed between said photographing optical system and said image sensor, a shutter disposed between said photographing optical system and said optical element and which has one or more shutter curtains that are capable of traveling between an open state and a closed state, first vibration means operable to cause said optical element to vibrate, second vibration means operable to cause said one or more shutter curtains to vibrate, and control means configured to control the timing of the operation of said first vibration means and said second vibration means.

According to a third aspect of the present invention, there is provided a method for removing dust from internal parts of an image capturing apparatus including a shutter having one or more shutter curtains and an optical element, the method comprising vibrating said optical element, and subsequently vibrating said one or more shutter curtains.

According to a fourth aspect of the present invention, there is provided a method for removing dust from internal parts of an image capturing apparatus including a shutter having one or more shutter curtains and an optical element, the method comprising vibrating said optical element, and at the same time vibrating said one or more shutter curtains.

Further features of the present invention will become apparent from the following description of exemplary embodiments with reference to the attached drawings.

BRIEF DESCRIPTION OF THE DRAWINGS

FIG. 4 is an exploded oblique perspective view that illustrates the schematic configuration of the camera interior in order to illustrate the support structure around an infrared cut-off filter and an image sensor;

FIG. 5 is an oblique perspective view that shows the configuration of a photographing unit;

FIG. 25 is a view that illustrates driving timing of a piezo-electric element and a shutter at a time of the sensor cleaning process;

FIG. 31 is a view illustrating driving timing of a piezo-electric element and a shutter at a time of the sensor cleaning process according to the third embodiment.

DESCRIPTION OF THE EMBODIMENTS

Preferred embodiments of the present invention will now be described in detail with reference to the attached drawings. The embodiments are not intended to limit the present invention according to the claims. Further, all of the combinations of features described in these embodiments are not necessarily essential for the present invention.

First Embodiment

Figure 1:
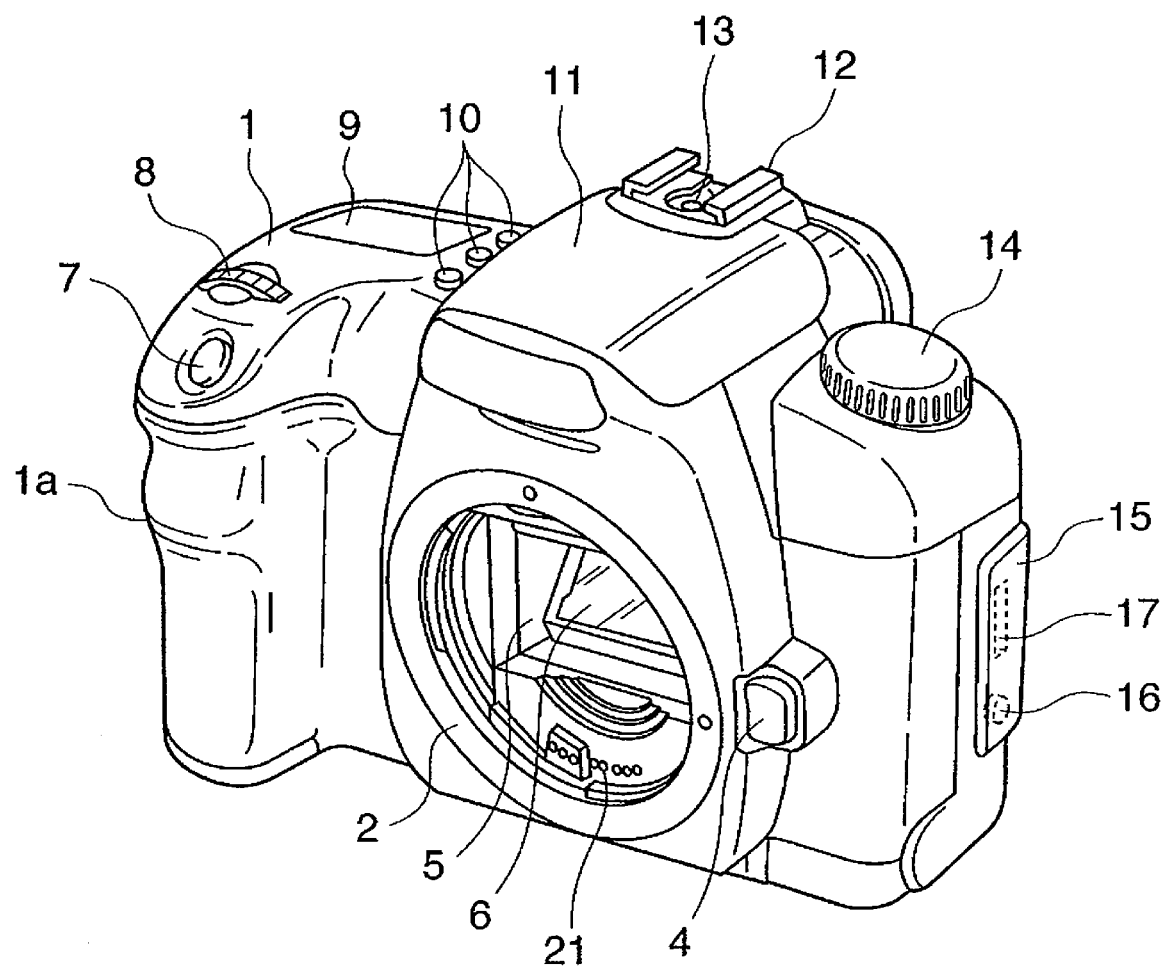
FIG. 1 is a front perspective view that illustrates the external appearance of a single-lens reflex digital camera according to a first embodiment of the present invention.
Figure 2:
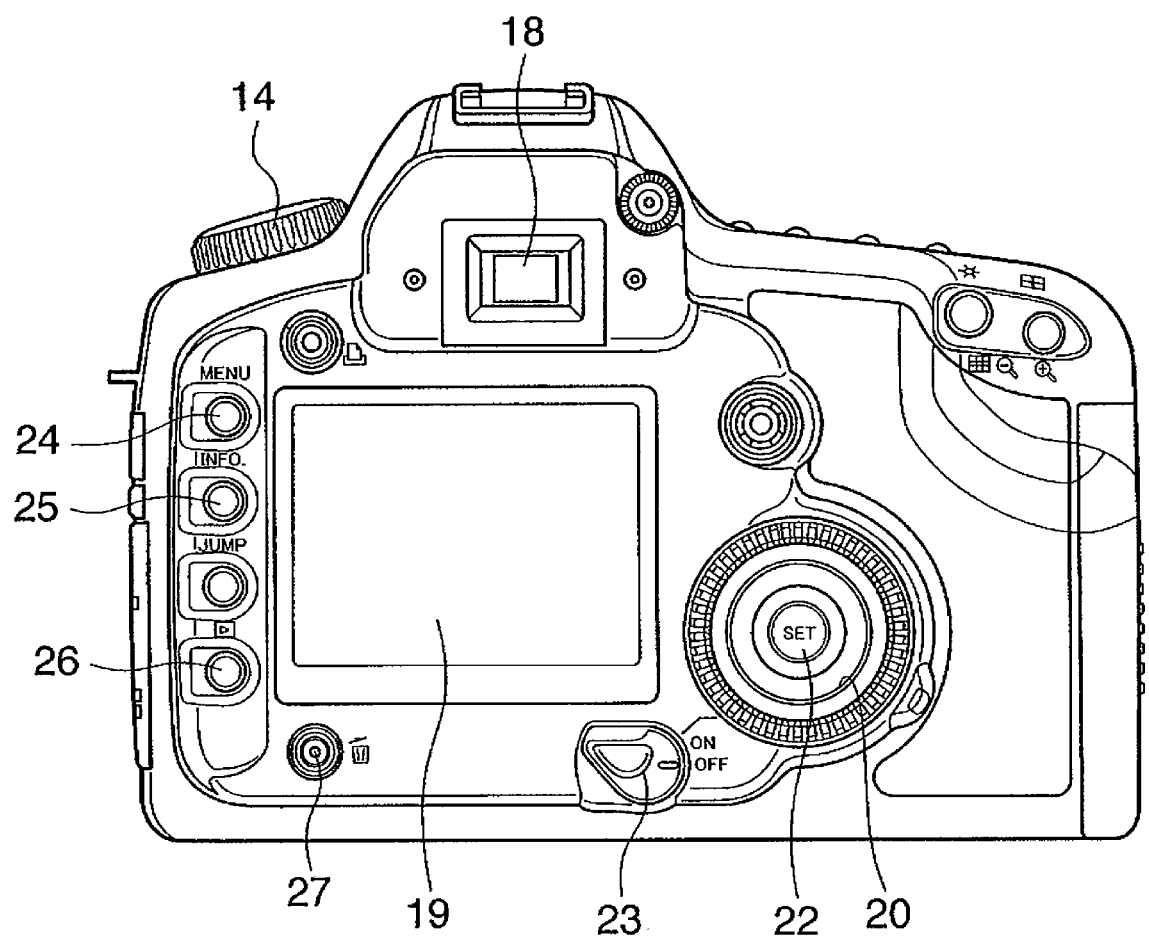
FIG. 2 is a rear perspective view that shows the external appearance of the single-lens reflex digital camera according to the first embodiment of the present invention.

FIG. 1 and FIG. 2 are perspective views that show the external appearance of a single-lens reflex digital camera as a first embodiment of an image capturing apparatus according to the present invention. More specifically, FIG. 1 is a perspective view as seen from the front surface side of the camera, and it shows a state in which a photographing lens unit is detached. FIG. 2 is a perspective view as seen from the rear surface side of the camera.

In FIG. 1, reference numeral 1 denotes a camera main unit that is provided with a grip portion 1a that protrudes toward the front to make it easy for a user to stabilize and grip the camera when photographing. Reference numeral 2 denotes a mount portion for fixing a detachable photographing lens unit 200a (see FIG. 3A) to the camera main unit 1. A mount contact point 21 has a function of exchanging control signals, status signals, data signals, and the like between the camera main unit 1 and the photographing lens unit 200a and also of supplying power to the photographing lens unit side. Further, the mount contact point 21 may be configured to enable not only electrical communication, but also optical communication and speech communication and the like. In this connection, the photographing lens unit 200a is a photographing optical system that causes an optical image of an object to be formed on an image sensor 123 that is described later.

Reference numeral 4 denotes a lens-lock release button that is pressed when detaching the photographing lens unit 200a. Reference numeral 5 denotes a mirror box that is disposed inside the camera case. A photographing light beam that passes through the photographing lens is guided to the mirror box 5. A quick return mirror 6 is provided inside the mirror box 5. The quick return mirror 6 can take a first position and a second position. The term "first position" refers to a position at which the quick return mirror 6 is retained at an angle of 45° with respect to the photographing optical axis in order to guide a photographing light beam in the direction of a pentaprism 22a (see FIG. 3A) that is described later. The term "second position" refers to a position at which the quick return mirror 6 is withdrawn from the path of a photographing light beam in order to guide the photographing light beam in the direction of an image sensor 123 (see FIG. 3A) that is described later.

On an upper grip side of the camera main unit 1 are provided a shutter button 7 as an activation switch for starting photographing and a main operation dial 8 for setting a shutter speed or a lens aperture value in accordance with an operation mode when photographing. An operation mode setting button 10 for setting an operation mode of the photographing system is also provided. A part of the operation results of these operation members is displayed on an LCD display panel 9.

The shutter button 7 is configured so that a switch SW1 (7a in FIG. 3B) is turned on with a first stroke (half-depression) and a switch SW2 (7b in FIG. 3B) is turned on with a second stroke (full depression).

Further, the operation mode setting button 10 is a button for making settings such as whether to photograph continuous exposures or only one frame when the shutter button 7 is pressed once as well as setting a "self photographing" mode and the like. The setting status thereof is displayed on the LCD display panel 9.

At the upper center of the camera main unit 1 are provided a strobe unit 11 that pops up from the camera main unit 1, a shoe groove 12 for attaching a flash, and a flash contact point 13. Toward the right side on the upper part of the camera (FIG. 1) is disposed a photographing mode setting dial 14.

On the side surface on the opposite side to the grip side is provided an external terminal cover 15 that is capable of opening and closing. A video signal output jack 16 and a USB output connector 17 are housed as external interfaces on the inside of the external terminal cover 15.

In FIG. 2, on the rear surface side of the camera, a finder eyepiece window 18 is provided at the upper part thereof and a display such as a backface monitor 19 that is capable of displaying an image is provided in the vicinity of the center of the back surface.

The backface monitor 19 comprises a liquid crystal panel for displaying color images, and performs the following types of display. That is, the backface monitor 19 displays various selectable setting items relating to photographed images when a menu button 24 is depressed. When an Info button 25 is depressed, the backface monitor 19 displays a list of the status of various setting items relating to photographed images. Further, when a display button 26 is depressed, the backface monitor 19 displays images that are recorded in recording media or displays an image immediately after photographing.

Reference numeral 20 denotes a sub-operation dial. The following operations are performed when the sub-operation dial 20 is rotated in the clockwise direction or counter-clockwise direction. That is, operations are performed to change the settings of a light control amount correction value, change the settings for ISO sensitivity, and change the settings for a WB mode that are photographing information. Further, operations are performed to select various setting items relating to photographed images that are displayed by pressing the menu button 24 or to transfer a photographed image.

Reference numeral 22 denotes a SET button. The SET button 22 is configured to input a decision from a user regarding various setting items relating to a photographed image that is displayed by pressing the menu button 24 and selected using the sub-operation dial 20.

Reference numeral 23 denotes a main switch that is a power switch for activating or stopping operation of the camera.

Reference numeral 24 denotes the menu button that is configured to cause various setting items relating to photographed images to be displayed on the backface monitor 19.

Reference numeral 25 denotes the Info button. When the Info button 25 is depressed, a list showing the status of various setting items relating to photographed images is displayed on the backface monitor 19.

Reference numeral 26 denotes the display button. When the display button 26 is depressed, images that are recorded on recording media can be displayed.

Reference numeral 27 denotes an image delete button. When the delete button 27 is depressed, an image that is displayed on the backface monitor 19 is deleted and disposed of.

A cleaning mode according to the present embodiment is displayed on the backface monitor 19 as one of various setting items by depressing the menu button. The cleaning mode will be described in detail later.

Figure 3A:
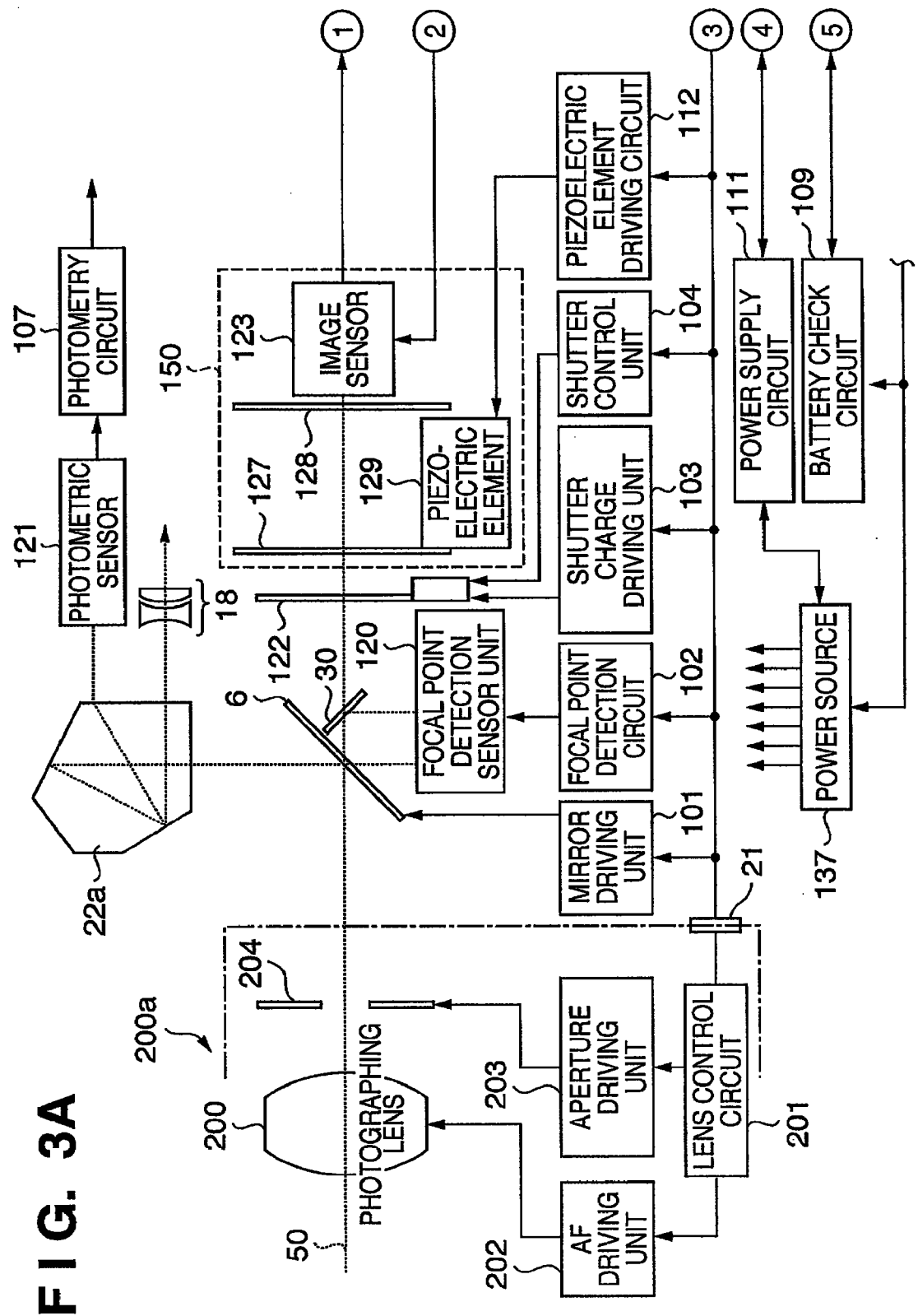
FIGS. 3A and 3B are block diagrams that illustrate the configuration of the single-lens reflex digital camera according to the first embodiment.
Figure 3B:
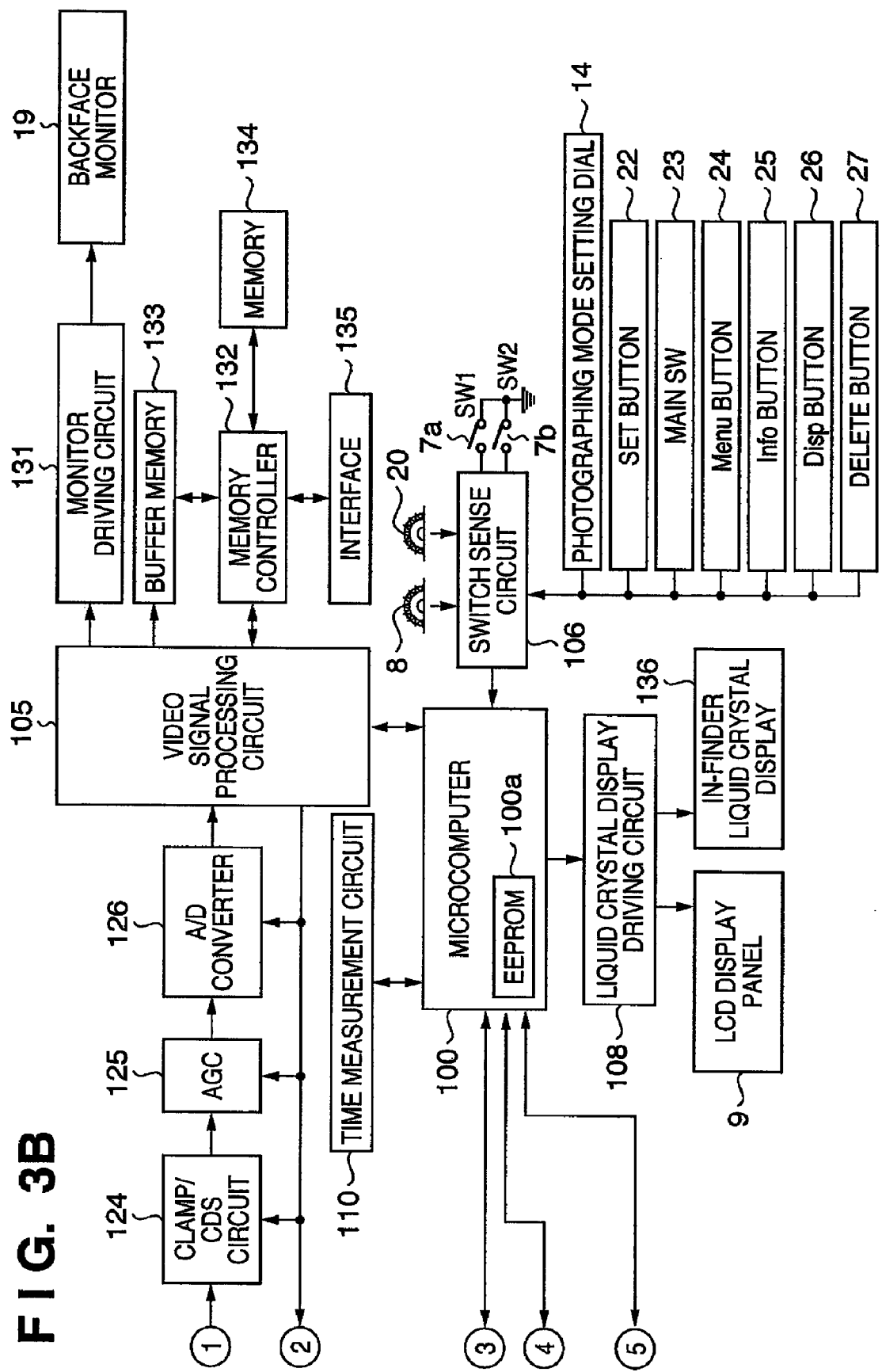

FIGS. 3A and 3B are block diagrams that illustrate the principal electrical configuration of the single-lens reflex digital camera according to the present embodiment. In FIGS. 3A and 3B, the parts that are common to both FIG. 1 and FIG. 2 are denoted by the same reference numerals.

Reference numeral 100 denotes a central processing unit (hereunder, referred to as "MPU") comprising a microcomputer that is housed inside the camera main unit. The MPU 100 is responsible for the operational control of the camera and executes various kinds of processing and instructions with respect to each component by executing programs stored in a storage means (not shown). Reference numeral 100a denotes an EEPROM that is housed inside the MPU 100. The EEPROM 100a can store clock information of a time measurement circuit 110 and other information.

To the MPU 100 are connected a mirror driving unit 101, a focal point detection circuit 102, a shutter charge driving unit 103, a shutter control unit 104, a video signal processing circuit 105, a switch sense circuit 106, and a photometry circuit 107. Further, a liquid crystal display driving circuit 108, a battery check circuit 109, a time measurement circuit 110, a power supply circuit 111, and a piezo-electric element driving circuit 112 are also connected to the MPU 100.

Further, the MPU 100 performs communication with a lens control circuit 201 that is provided inside the photographing lens unit 200a via the mount contact point 21. The mount contact point 21 also comprises a function that sends a signal to the MPU 100 when the photographing lens unit 200a is connected. As a result, the lens control circuit 201 can carry out communication with the MPU 100, and can perform driving of the aperture 204 and the photographing lens 200 inside the photographing lens unit 200a via the AF driving unit 202 and the aperture driving unit 203. In this regard, although according to the present embodiment the photographing lens 200 is illustrated as a single lens for convenience, in fact the photographing lens 200 may be constituted by a group of multiple lenses.

The AF driving unit 202 is constituted by, for example, a stepping motor, and performs adjustment so as to focus a photographing light beam on the image sensor 123 by altering a focus lens position inside the photographing lens 200 through control of the lens control circuit 201. The aperture driving unit 203 is constituted by, for example, an auto iris, and is configured so as to alter the aperture 204 using the lens control circuit 201 to obtain an optical aperture value.

The quick return mirror 6 guides a photographing light beam that passes through the photographing lens 200 to the pentaprism 22a, and also allows a portion thereof to penetrate through to be guided to a sub-mirror 30. The sub-mirror 30 guides the photographing light beam that penetrates through to a focal point detection sensor unit 120.

The mirror driving unit 101 drives the quick return mirror 6 to a position at which an object image is observable by the finder and to a position at which it is sheltered from a photographing light beam. Simultaneously with such operations, the mirror driving unit 101 drives the sub-mirror 30 to a position at which it guides a photographing light beam to the focal point detection sensor unit 120, and to a position at which is which it is sheltered from a photographing light beam. More specifically, the mirror driving unit 101 is comprised by, for example, a DC motor and a gear train.

The focal point detection sensor unit 120 uses a known phase difference detection system that comprises a field lens, a reflection mirror, a secondary image forming lens, an aperture, and a line sensor consisting of a plurality of CCDs and the like that that are disposed in the vicinity of an image forming surface (not shown). A signal that is output from the focal point detection sensor unit 120 is supplied to the focal point detection circuit 102, converted to an object image signal, and thereafter sent to the MPU 100. The MPU 100 performs a focal point detection calculation according to a phase difference detection method based on this object image signal. Next, the MPU 100 determines a defocus amount and a defocus direction, and based on these results drives a focus lens inside the photographing lens 200 towards a focus position via the lens control circuit 201 and the AF driving unit 202.

The pentaprism 22a is an optical member that converts and reflects a photographing light beam that is reflected by the quick return mirror 6 into an erect normal image. A user can observe an object image from the finder eyepiece window 18 via the finder optical system. The pentaprism 22a also guides one portion of a photographing light beam to the photometric sensor 121. The photometry circuit 107 obtains the output of the photometric sensor 121, converts the output to brightness signals for each area on the observation plane, and outputs the brightness signals to the MPU 100. The MPU 100 calculates an exposure value based on the brightness signals that are obtained in this manner.

Reference numeral 122 denotes a mechanical focal plane shutter that blocks the photographing light beam when a user is observing an object image using the finder. The focal plane shutter 122 is disposed at a position in which there is a slight gap between the focal plane shutter 122 and an infrared cut-off filter 127 that is described later. Further, the focal plane shutter 122 is configured so as to obtain a desired exposure time by a time difference between the movement of a group of one or more leading blades and the movement of a group of one or more trailing blades, described later, in accordance with a release signal when capturing an image. The focal plane shutter 122 is subjected to shutter charge driving by a shutter charge driving unit 103 by the shutter control unit 104 upon receiving a command from the MPU 100, after movement of the group of leading blades and the group of trailing blades that are described later.

Reference numeral 123 denotes the image sensor, for example, a CMOS circuit. Various forms are available for this image capturing device, such as a CCD type, a CMOS type, and a CID type, and an image capturing device of any form may be employed. Light that is received in a region of image-capturing field of the image sensor 123 is captured as an image. Although the center of the image-capturing field is normally made to match the lens optical axis of the photographing lens 200, in cropped photographing and the like in which an image is captured using only a portion of the pixels of the image sensor 123, there are cases in which the center of the image-capturing field is not made to match the lens optical axis.

Reference numeral 124 in FIG. 3B denotes a clamp/CDS (correlated double sampling) circuit that performs basic analog processing prior to A/D conversion and that can also change a clamp level. Reference numeral 125 denotes an AGC (automatic gain control circuit) that performs basic analog processing prior to A/D conversion and that can also change an AGC basic level. Reference numeral 126 denotes an A/D converter that converts an analog output signal of the image sensor 123 into a digital signal.

Reference numeral 127 in FIG. 3A denotes an infrared cut-off filter that has a substantially oblong shape. The infrared cut-off filter 127 cuts off unwanted infrared light of a light beam that is incident on the image sensor 123. In order to prevent the adherence of foreign substances, the surface is covered with an electrically conductive material.

Reference numeral 128 denotes an optical low pass filter that has a substantially oblong shape. In the optical low pass filter 128, a plurality of phase plates and birefringent plates comprising quartz crystal or the like are fixed together and laminated. The optical low pass filter 128 divides a light beam that is incident on the image sensor 123 into a plurality of beams to effectively reduce the occurrence of spurious resolution signals or spurious color signals.

Reference numeral 129 denotes an excitation member that imparts a vibration to the infrared cut-off filter 127. In the present embodiment a piezo-electric element is used as the excitation member 129. The excitation member 129 is excited by the piezo-electric element driving circuit 112 upon receipt of a command from the MPU 100, and is configured to vibrate integrally with the infrared cut-off filter 127. Reference numeral 150 denotes a photographing unit in which the infrared cut-off filter 127, the piezo-electric element 129, the image sensor 123, and other components that are described later are formed into a unit. The detailed configuration of the photographing unit 150 is described later.

The video signal processing circuit 105 in FIG. 3B executes overall image processing by hardware, such as gamma/knee processing, filtering, and information synthesis processing for monitor display for the digitalized image data. The image data for display from the video signal processing circuit 105 is displayed on the backface monitor 19 via the monitor driving circuit 131. The video signal processing circuit 105 is also capable of storing image data in a buffer memory 133 through a memory controller 132 in accordance with an instruction of the MPU 100. Further, the video signal processing circuit 105 also has a function of compressing image data such as JPEG data. In the case of continuous photographing such as for a continuous exposure mode, the video signal processing circuit 105 can temporarily store image data in the buffer memory 133 and thereafter sequentially read out unprocessed image data through the memory controller 132. As a result, the video signal processing circuit 105 is capable of sequentially performing image processing or compression processing irrespective of the speed of image data that is input from the A/D converter 126.

The memory controller 132 has a function that stores image data that is input from an external interface 135 (corresponds to the video signal output jack 16 and the USB output connector 17 shown in FIG. 1) in a memory 134. The memory controller 132 also has a function that outputs image data that is stored in the memory 134 from the external interface 135. In this connection, the memory 134 is a flash memory or the like that is detachable from the camera main unit 1.

The switch sense circuit 106 sends input signals to the MPU 100 in accordance with the operation state of each switch. Reference numeral 7a denotes a switch SW1 that is turned on by a first stroke (half-depression) of the shutter button 7. Reference numeral 7b denotes a switch SW2 that is turned on by a second stroke (full depression) of the shutter button 7. When the switch SW2 is turned on, start of photographing is instructed to the MPU 100. The main operation dial 8, the sub-operation dial 20, the SET button 22, the photographing mode setting dial 14, the main switch 23, the menu button 24, the Info button 25, the display button 26, and the delete button 27 are also connected to the switch sense circuit 106.

The liquid crystal display driving circuit 108 drives the LCD display panel 9 or an in-finder liquid crystal display 136 in accordance with an instruction of the MPU 100.

Reference numeral 109 denotes a battery check circuit. The battery check circuit 109 performs a battery check for a predetermined time in accordance with a signal from the MPU 100 and sends the check result to the MPU 100. Reference numeral 137 denotes a power source that supplies necessary power to each component of the camera main unit 1.

The time measurement circuit 110 measures a time or date from when the main switch 23 is turned off until the main switch 23 is next turned on, and can send the measurement result to the MPU 100 in accordance with a command from the MPU 100.

Next, the detailed configuration of the photographing unit 150 will be described using FIG. 4 to FIG. 10.

FIG. 4 is an exploded perspective view that illustrates the schematic configuration of the inside of the camera main unit 1 to describe the support structure around the photographing unit 150.

On the object side of a main unit chassis 160 that serves as the framework of the camera main unit are disposed the mirror box 5 and the focal plane shutter 122. Further, the photographing unit 150 is disposed on the image side of the main unit chassis 160. In particular, the photographing unit 150 is fixed by ensuring that the image capturing surface of the image sensor 123 is disposed in parallel with, and at a clearance a predetermined distance from, the attachment surface of the mount portion 2 that serves as a reference to which the photographing lens unit 200a is attached, shown in FIG. 1.

FIG. 5 is a perspective view that shows the configuration of the photographing unit 150.

The photographing unit 150 comprises a vibration unit 170, an image sensor unit 180, and an elastic member 190. The vibration unit 170 is fixed to the image sensor unit 180 in a manner sandwiching the elastic member 190 therebetween. This configuration will be described in detail later.

The image sensor unit 180 comprises at least the image sensor 123 and a fixing member 181. The vibration unit 170 comprises the infrared cut-off filter 127, the piezo-electric element 129 (see FIG. 3A), an urging member 171 and the like.

An electrical circuit of an image capturing system is mounted on a circuit board 182. A shield case 183 is formed by a metal or the like that has electrical conductivity. The circuit board 182 and the shield case 183 are engaged with the fixing member 181 by means of a screw or the like. The shield case 183 is connected to ground potential on a circuit for protecting the electrical circuit from static electricity. In shading member 184, an opening is formed that corresponds to an effective area of the photo-electric conversion surface of the image sensor 123, and double-faced adhesive tape is affixed to the object side and the image side thereof. An optical low-pass filter retaining member 185 is affixed to the cover glass of the image sensor 123 by the double-faced adhesive tape of the shading member 184. The optical low-pass filter 128 is positioned at the location of an opening of the optical low-pass filter retaining member 185, and is fixingly held on the shading member 184 with double-faced adhesive tape.

Figure 6:
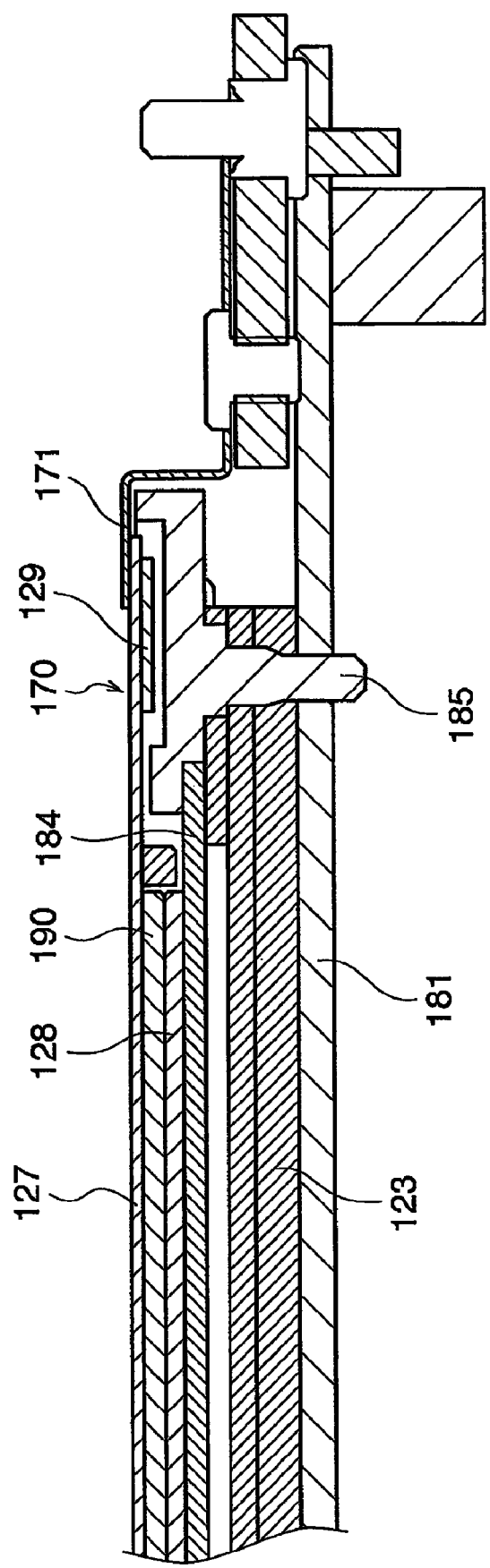
FIG. 6 is a sectional view along a line A-A shown in FIG. 4.

FIG. 6 is a sectional view of one portion of the photographing unit 150 along a line A-A shown in FIG. 4. The surface on the object side of the shading member 184 (the top surface in the Figure) is in contact with the optical low-pass filter 128, and the surface on the image side thereof is in contact with the cover glass of the image sensor 123. Double-faced adhesive tape is affixed to the object side and the image side of the shading member 184. The optical low-pass filter 128 is fixingly retained on the cover glass of the image sensor 123 by the double-faced adhesive tape of the shading member 184. As a result, the region between the optical low-pass filter 128 and the cover glass of the image sensor 123 is sealed by the shading member 184 in a manner forming an enclosed space that prevents entry of foreign substances such as dust. Further, the surface on the object side of the elastic member 190 contacts against the infrared cut-off filter 127, and the surface on the image side thereof contacts against the optical low-pass filter 128. The vibration unit 170 is urged towards the photographing unit 150 side by the resilience of the urging member 171. Therefore the elastic member 190 and the infrared cut-off filter 127 contact each other without any clearance therebetween and, similarly, the elastic member 190 and the optical low pass filter 128 also contact each other without any clearance therebetween. As a result, the area between the infrared cut-off filter 127 and the optical low pass filter 128 is sealed by the elastic member 190 in a manner forming an enclosed space that prevents entry of foreign substances such as dust.

Figure 7:
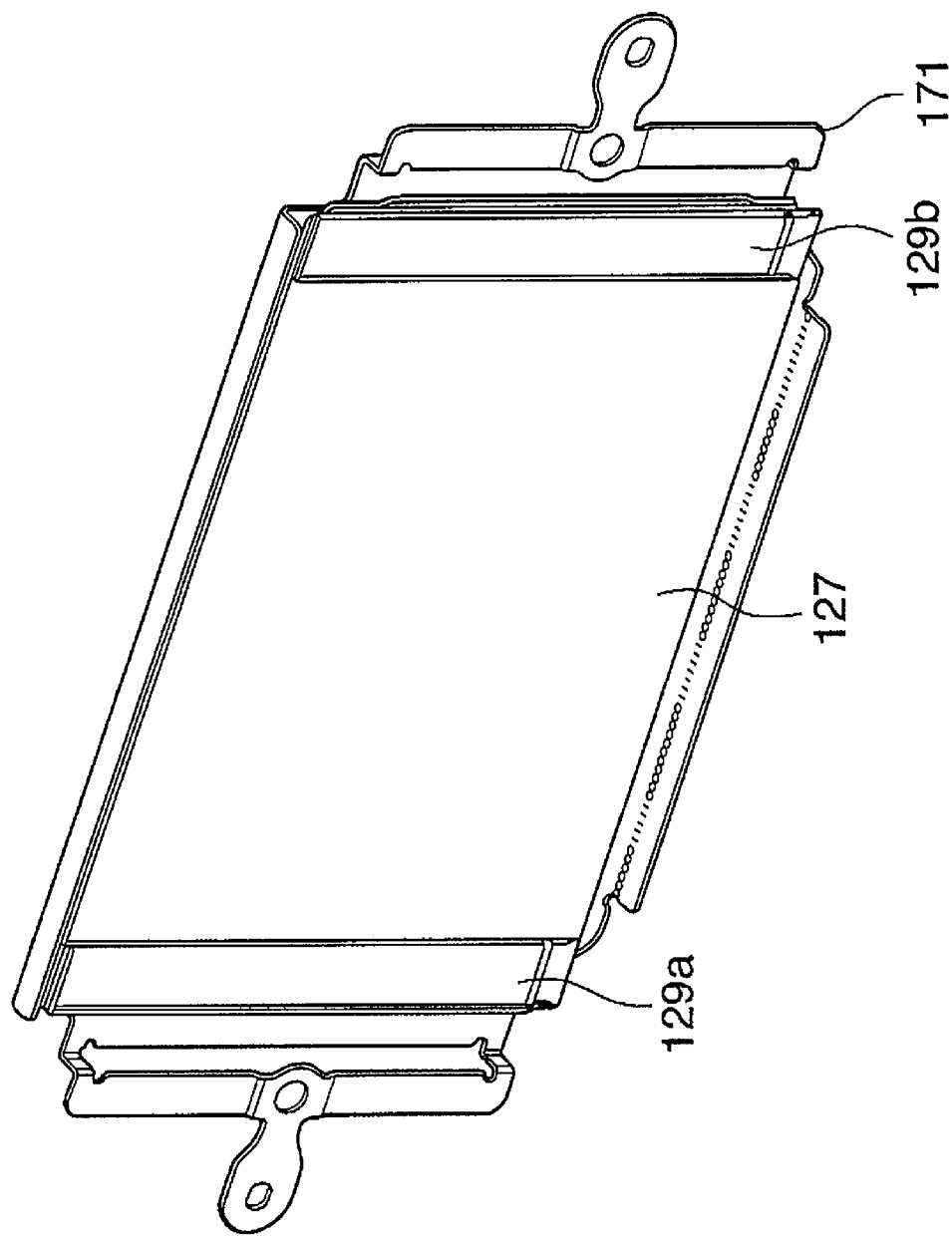
FIG. 7 is a perspective view that illustrates the detailed configuration of a vibration unit.

FIG. 7 is a perspective view that illustrates the detailed configuration of the vibration unit 170. In FIG. 7, reference numerals 129a and 129b denote piezo-electric elements that are affixed to the ends of the infrared cut-off filter 127 using fixing means such as, for example, an adhesive. In the present embodiment a total of two piezo-electric elements 129a and 129b having the same shape are affixed to the two opposite ends of the infrared cut-off filter 127.

Figure 8:
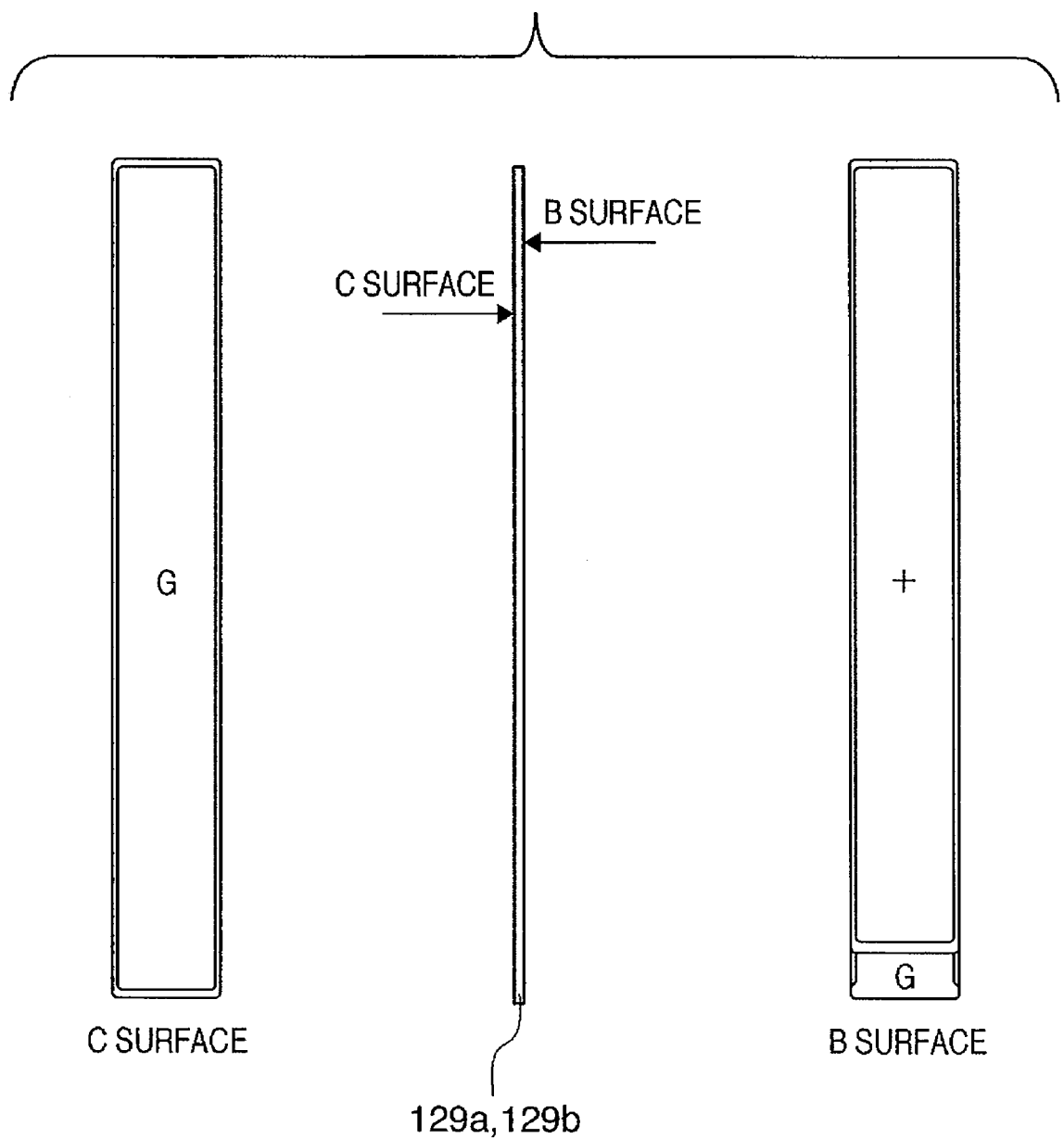
FIG. 8 is a detail view of a piezo-electric element in the first embodiment.

FIG. 8 is a detailed view of the piezo-electric elements 129a and 129b. As shown in FIG. 8, an electrode is provided on a B surface of the piezo-electric elements 129a and 129b. The electrode may be formed by printing, for example, using an electrode material such as silver. This electrode is divided into a + phase region and a G phase region for exciting a flexural vibration in the infrared cut-off filter 127. Further, an electrode is provided over substantially the entire area of the C surface of the piezo-electric elements 129a and 129b. This electrode on the C surface is electrically connected with the G phase of the B surface by an unshown conductive material or the like, and the G phase regions are both maintained at the same electric potential. An unshown conductive link member such as a flexible printed wiring board is fixingly adhered by a method such as fastening with glue to the B surface, to enable predetermined voltages to be independently applied to the + phase and the G phase, respectively. The C surface of the piezo-electric elements 129*a* and 129*b* is fixingly adhered to the infrared cut-off filter 127 by a method such as fastening with glue, so that the piezo-electric elements 129*a* and 129*b* and the infrared cut-off filter 127 move in an integrated manner.

Figure 9:
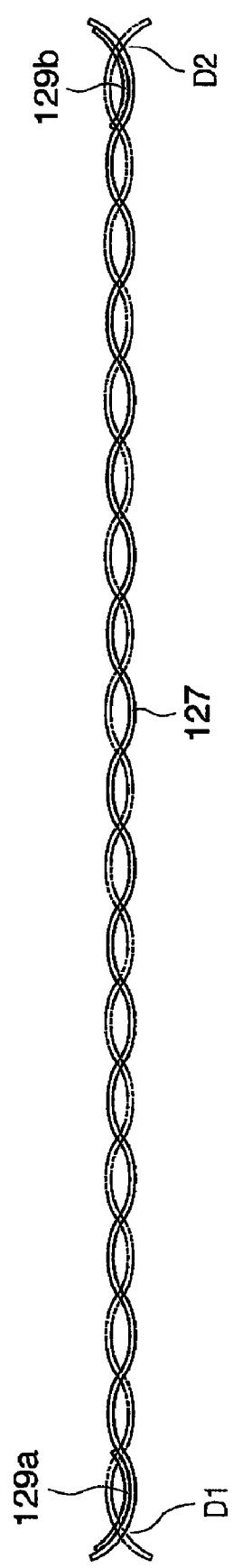
FIG. 9 is a side view that illustrates an infrared cut-off filter vibrating in a mode having 20 nodes.
Figure 10:
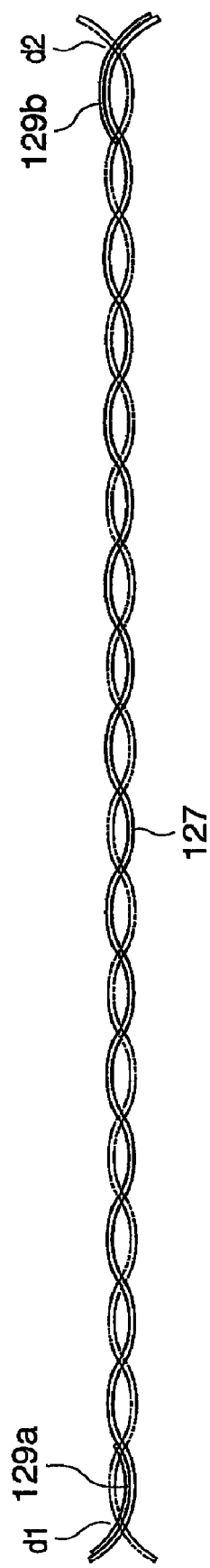
FIG. 10 is a side view that illustrates an infrared cut-off filter vibrates in a mode having 19 nodes.

Next, a mechanism in which the infrared cut-off filter 127 vibrates, and the vibration shape thereof are described using FIG. 9 and FIG. 10.

FIG. 9 is a side view as viewed from the top surface of the camera that illustrates a vibration shape when the infrared cut-off filter 127 vibrates in a mode having 20 nodes. FIG. 10 is a side view as viewed from the top surface of the camera that illustrates a vibration shape when the infrared cut-off filter 127 vibrates in a mode having 19 nodes.

First, deformation of the infrared cut-off filter 127 and the piezo-electric elements 129*a* and 129*b* is described in a case in which, taking the respective G phases thereof as a ground potential (0V), a positive voltage is applied to the respective + phases of the piezo-electric element 129*a* and the piezo-electric element 129*b* through an unshown conductive link member.

When the aforementioned voltage is applied, the + phase of the piezo-electric element contracts in a perpendicular direction to the surface and extends in an in-plane direction. Therefore, the surface of the infrared cut-off filter 127 that is bonded with the piezo-electric elements 129*a* and 129*b* receives a force from the piezo-electric elements 129*a* and 129*b* that expands the bonded surface in the in-plane direction. As a result, a deformation is produced such that the surface side that is bonded with the piezo-electric elements forms a convex shape. Hence, when the aforementioned voltage is applied to the respective + phases of the piezo-electric elements 129*a* and 129*b*, a bending deformation as shown by the solid lines in FIG. 9 arises in the infrared cut-off filter 127. Likewise, when the voltage that is applied to the + phase is taken as negative, a deformation in which the above described expansion and contraction are in the reverse directions occurs in the piezo-electric elements, and a bending deformation as illustrated by the chain double-dashed lines in FIG. 9 occurs in the infrared cut-off filter 127. At this time, since the same voltage is applied to the + phases of the piezo-electric elements 129*a* and 129*b*, the piezo-electric elements 129*a* and 129*b* are driven in phase.

Next, deformation of the piezo-electric elements 129*a* and 129*b* is described in a case in which, taking the respective G phases thereof as a ground (0V), a positive voltage is applied to the + phase of the piezo-electric element 129*a* and a negative voltage is applied to the + phase of the piezo-electric element 129*b* through a conductive link member.

When the above described voltages are applied, by the same mechanism as described above, the bonded surface between the piezo-electric element 129*a* and the infrared cut-off filter 127 is deformed such that it forms a convex shape and the bonded surface between the piezo-electric element 129*b* and the infrared cut-off filter 127 is deformed such that it forms a concave shape. Hence, when the above described voltages are applied to the respective + phases of the piezo-electric elements 129*a* and 129*b*, a bending deformation as shown by the solid lines in FIG. 10 occurs in the infrared cut-off filter 127. Likewise, if a negative voltage is applied to the + phase of the piezo-electric element 129*a* and a positive voltage is applied to the + phase of the piezo-electric element 129*b*, a deformation in which the above described expansion and contraction are in the reverse directions occurs in the piezo-electric elements, and a bending deformation as illustrated by the chain double-dashed lines in FIG. 10 occurs in the infrared cut-off filter 127. At this time, since opposite polarity voltages are applied to the + phases of the piezo-electric element 129*a* and the piezo-electric element 129*b*, the piezo-electric elements 129*a* and 129*b* are driven in opposite or anti-phase.

That is, when voltages applied to the respective + phases of the piezo-electric elements 129*a* and 129*b* are periodically switched between positive and negative in a state in which the potentials of the G-phase electrodes are maintained at ground, flexural vibrations arise so that the infrared cut-off filter 127 is periodically switched between a convex shape and a concave shape. As shown in FIG. 9 and FIG. 10, in the flexural vibration, nodal sections (for example, d1, d2, D1, and D2) of the vibration emerge in which the amplitude of vibration is substantially zero. If periodic voltages that are applied to the respective + phases of the piezo-electric elements 129*a* and 129*b* are made in-phase (in-phase driving), a flexural vibration occurs that has a shape in which the number of nodes of the vibration is even as shown in FIG. 9. Further, if the periodic voltages that are applied to the respective + phases are staggered by half a wavelength so that the voltages are in opposite phase (opposite-phase driving), a flexural vibration occurs that has a shape in which the number of nodes of the vibration is odd as shown in FIG. 10.

By making the frequency of these periodic voltages approximate to the resonance frequency of an inherent mode of the infrared cut-off filter 127, a larger amplitude can be obtained with a smaller voltage. Although the resonance frequency of an inherent mode of the infrared cut-off filter 127 will differ according to the shape, plate thickness, material properties and the like of the infrared cut-off filter 127, in order not to generate undesirable noise it is preferable to select an inherent mode such that the resonance frequency is outside the audible range.

Although the present embodiment has been described taking as an example a mode in which 20 nodes emerge and a mode in which 19 nodes emerge, the present invention is not limited thereto, and the present embodiment may be configured to generate vibrations other than these, or may use three or more kinds of vibration modes.

Further, according to the present embodiment a configuration is adopted in which a flexural vibration is induced in the infrared cut-off filter 127. However, a configuration may also be adopted in which a flexural vibration is induced in the optical low pass filter 128 that is constituted by lamination of the birefringent plate, the phase plate, and the infrared cut-off filter, or in which a flexural vibration is induced singly in only the birefringent plate or only the phase plate.

Next, the configuration of the focal plane shutter 122 according to the present embodiment is described referring to FIG. 11 to FIG. 20.

Figure 11:
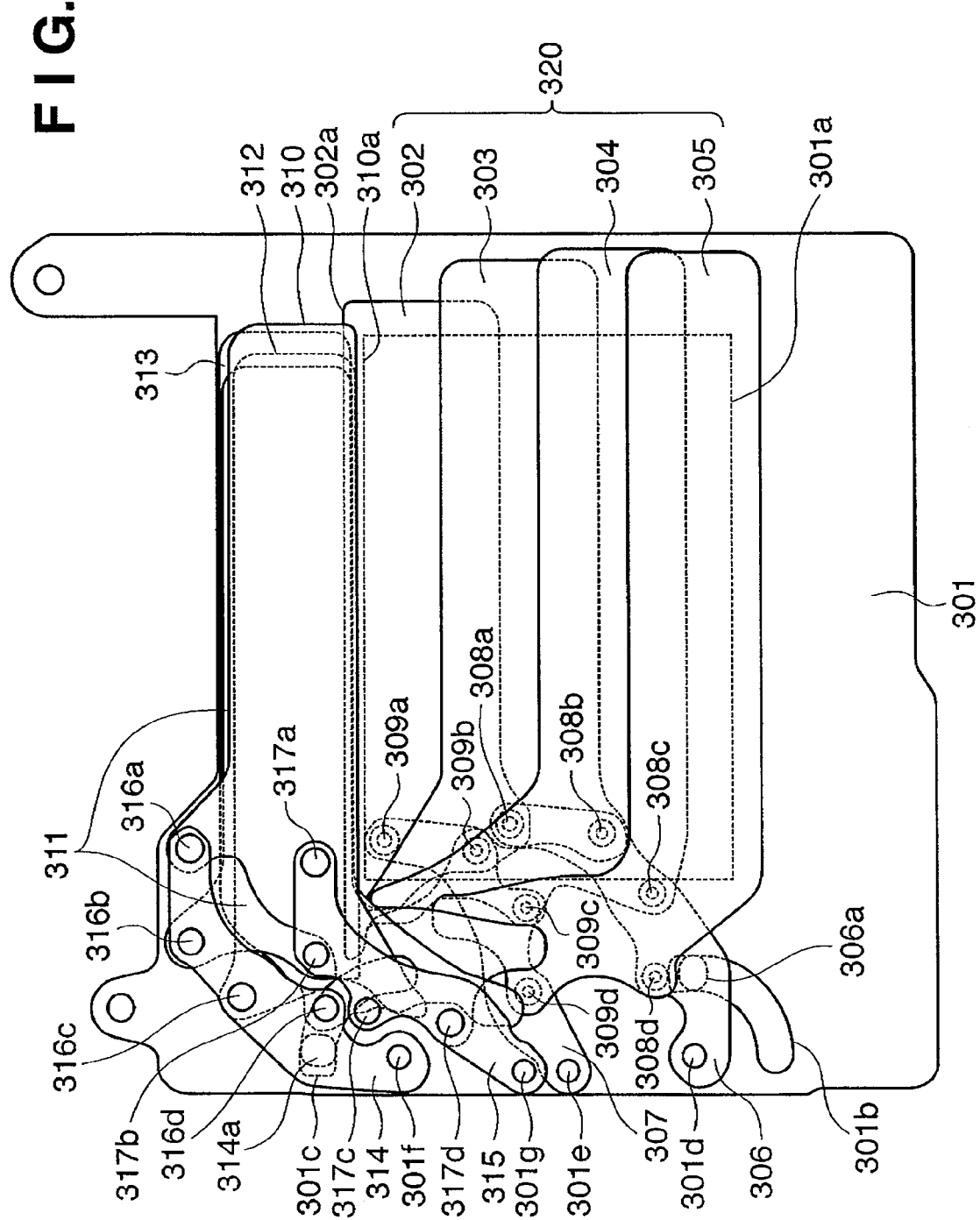
FIG. 11 is a front view that illustrates a blade unit in a focal plane shutter immediately before movement according to the first embodiment.
Figure 12:
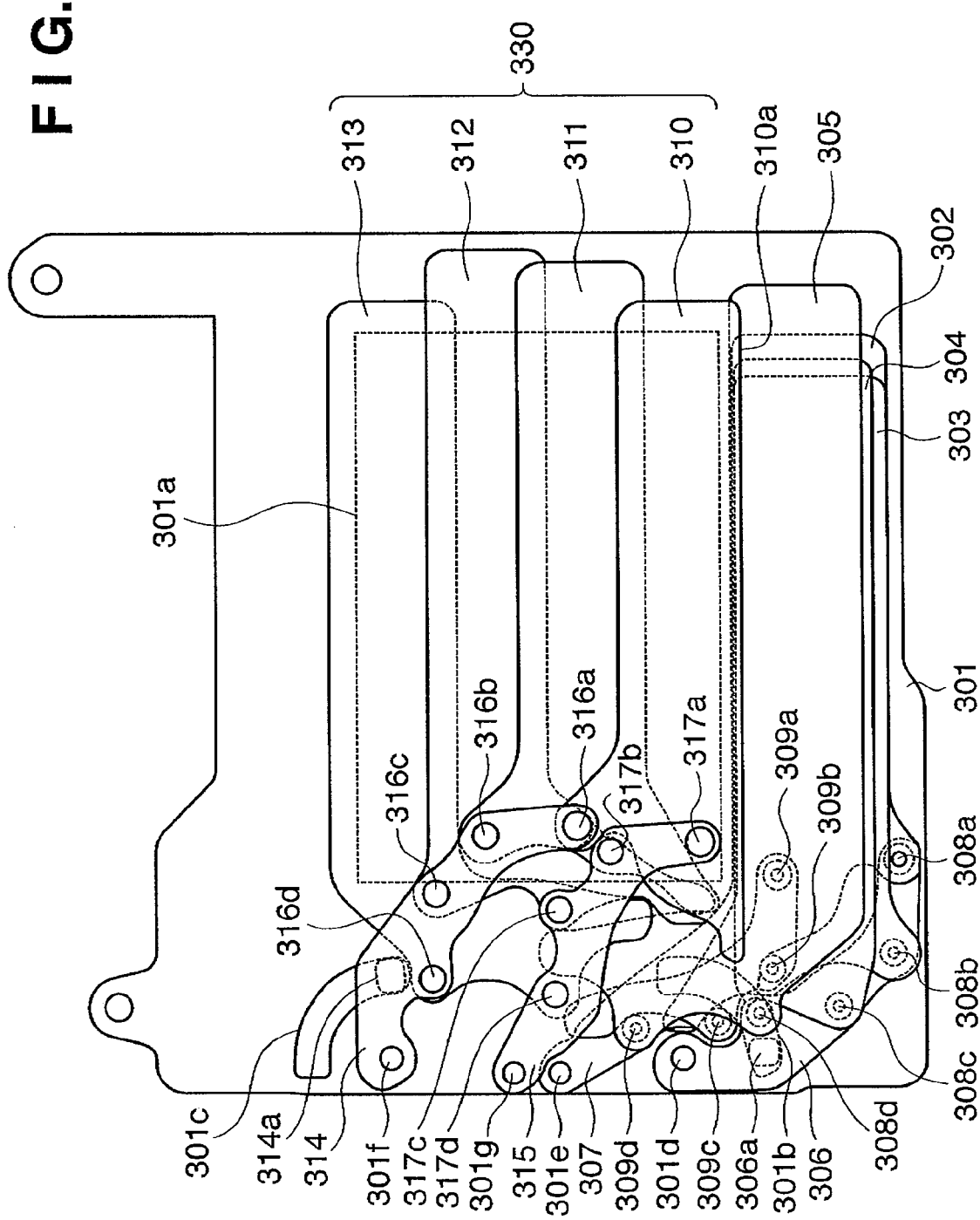
FIG. 12 is a front view that illustrates a a blade unit in a focal plane shutter immediately after movement according to the first embodiment.

FIG. 11 and FIG. 12 are front views of the focal plane shutter 122. FIG. 11 is a view that illustrates a movement preparation completed state before the shutter is released. FIG. 12 is a view that illustrates a movement completed state after the shutter is released.

Figure 13:
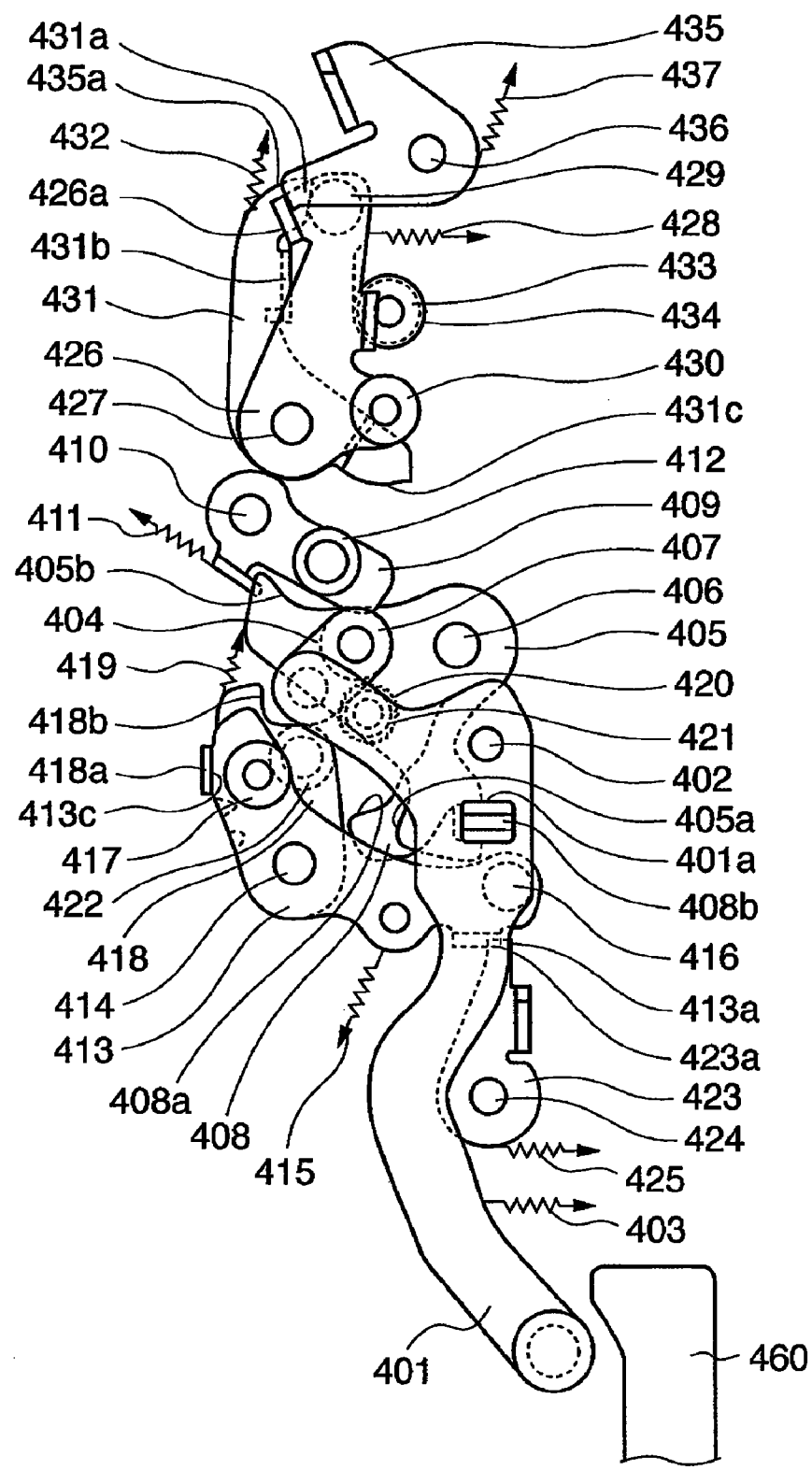
FIG. 13 is a main part plan view showing a charge completion state of the focal plane shutter.
Figure 14:
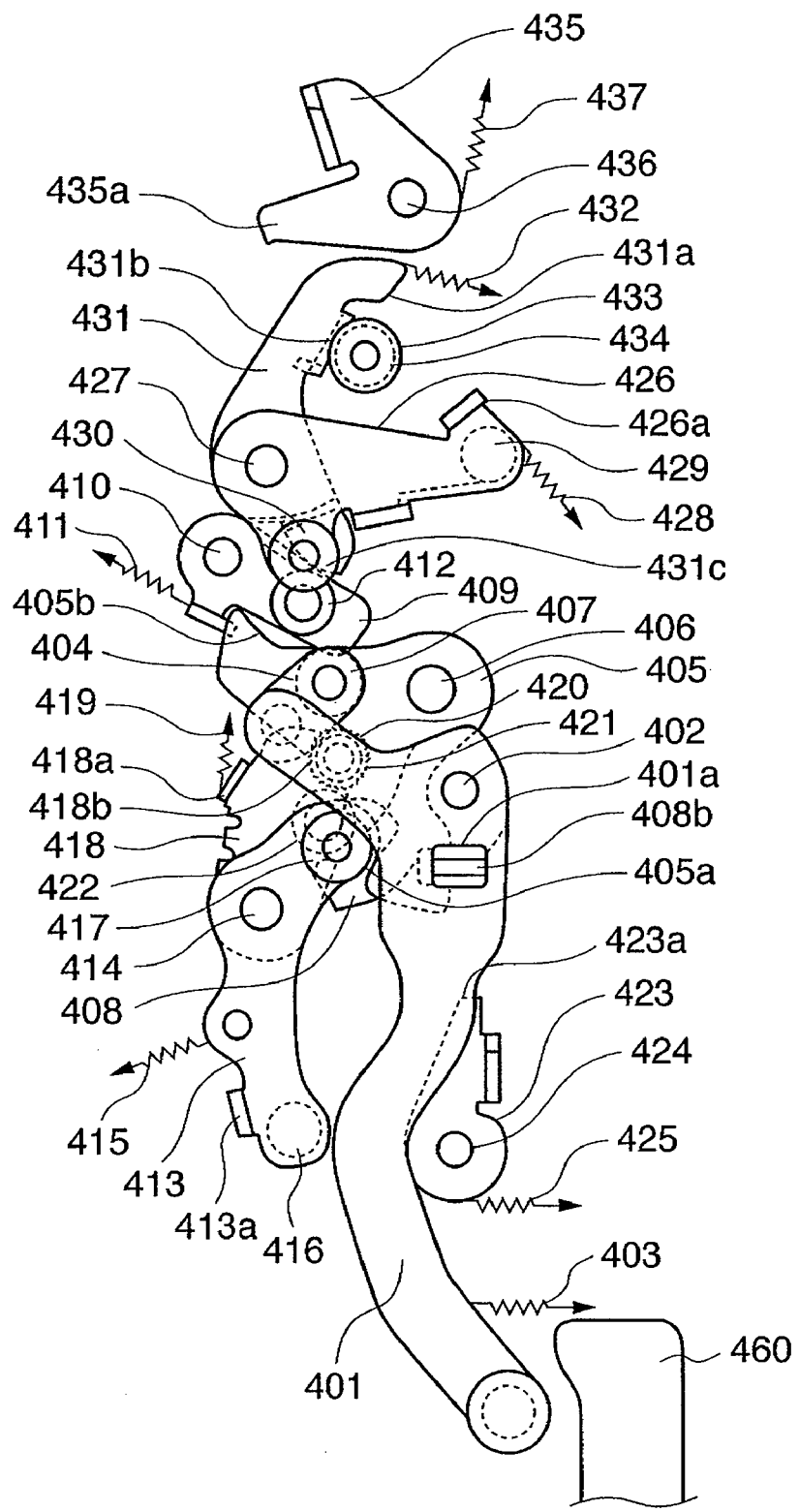
FIG. 14 is a main part plan view showing a release state (state prior to start of charging) of leading blades and trailing blades of the focal plane shutter.
Figure 15:
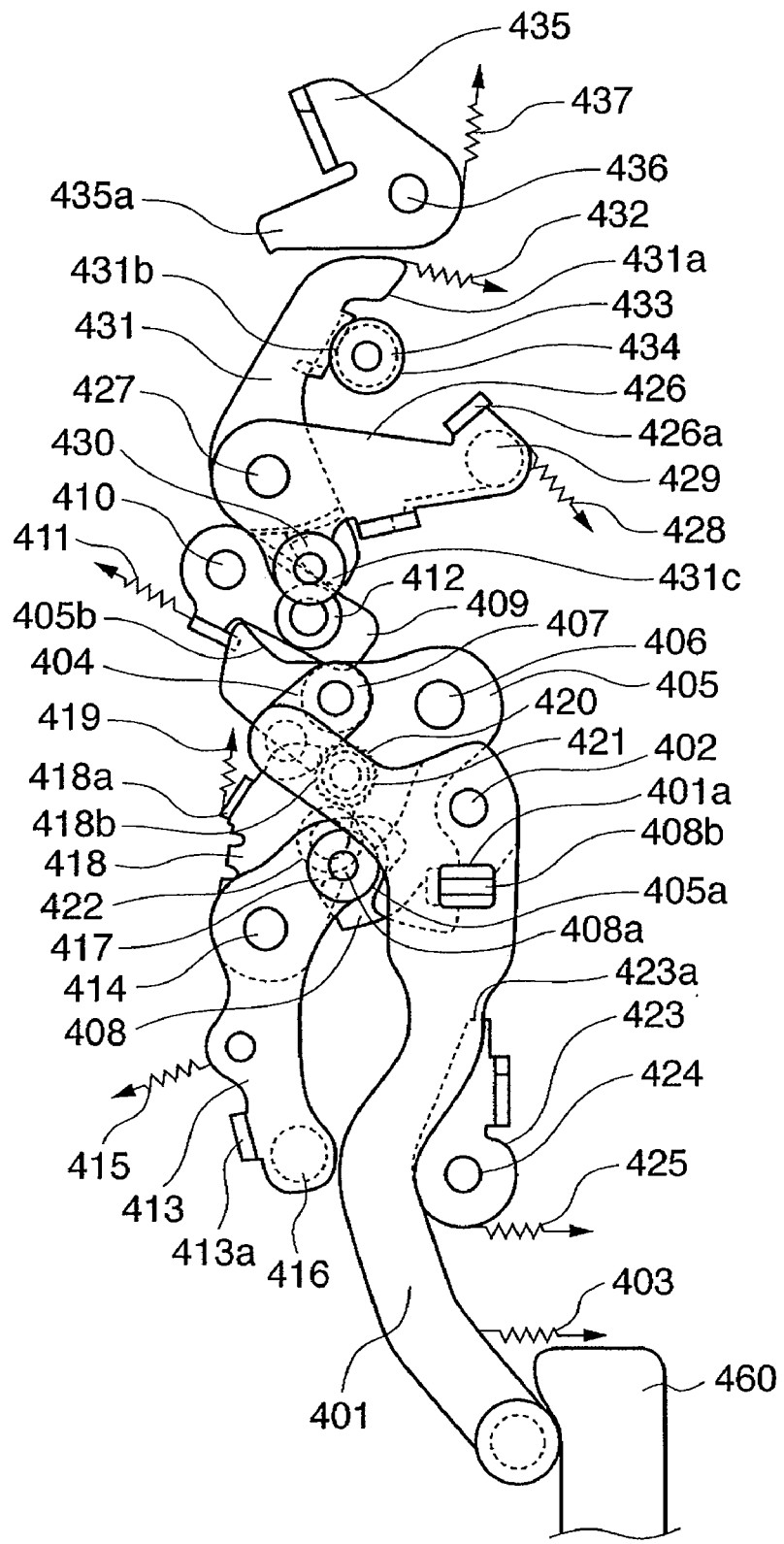
FIG. 15 is a main part plan view showing a state during charging of the focal plane shutter.
Figure 16:
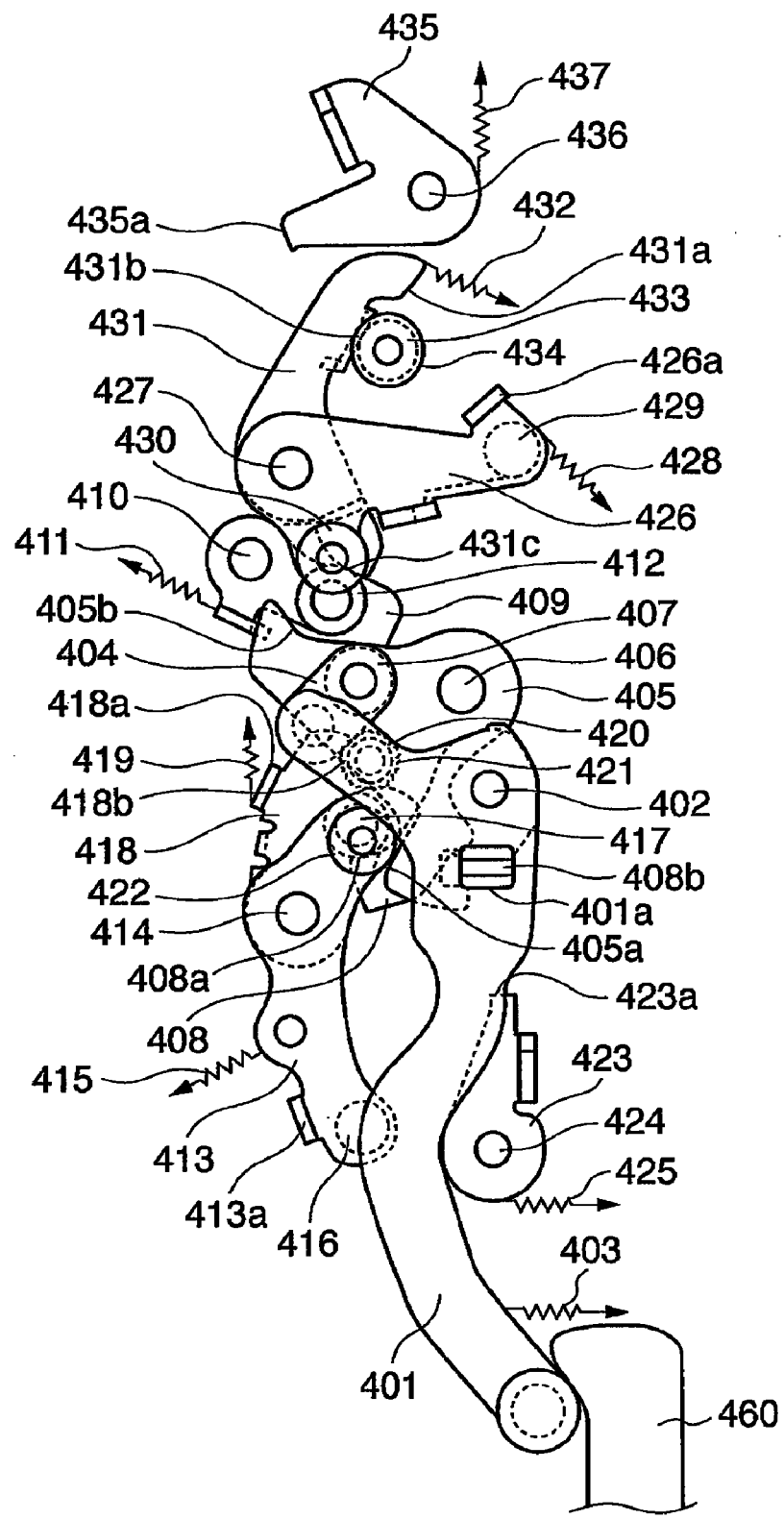
FIG. 16 is a main part plan view showing a state during charging of the focal plane shutter.
Figure 17:
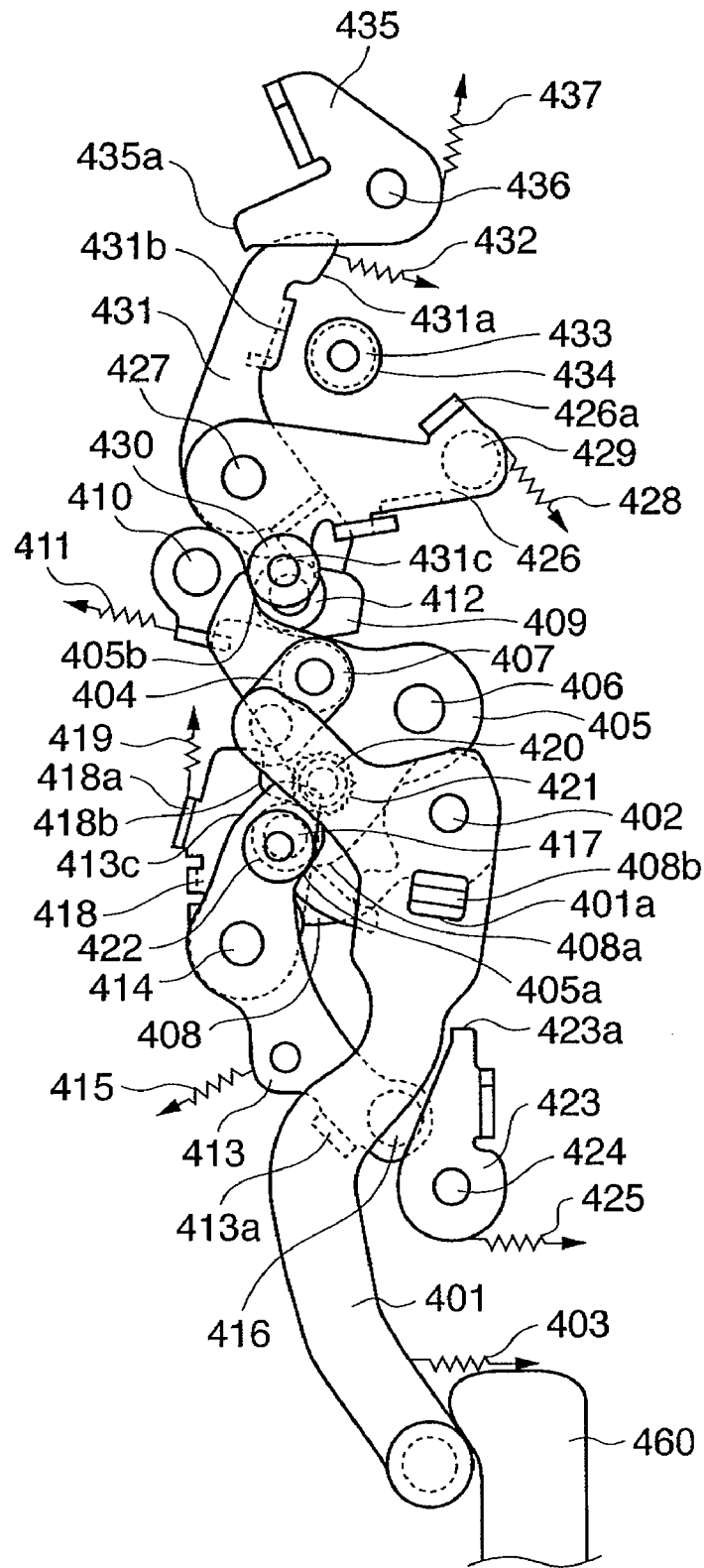
FIG. 17 is a main part plan view showing a state during charging of the focal plane shutter.
Figure 18:
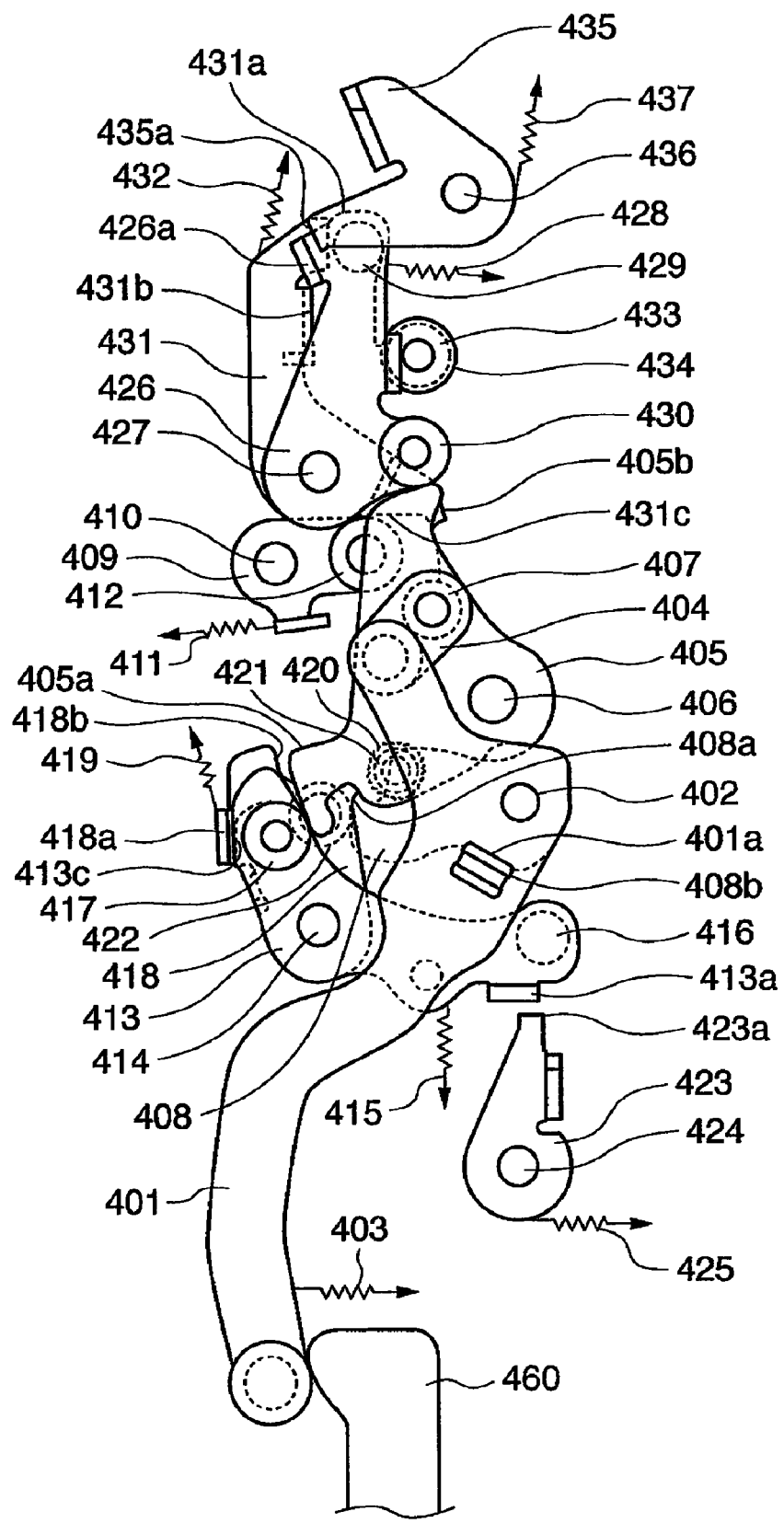
FIG. 18 is a main part plan view showing an overcharge state of the focal plane shutter.
Figure 19:
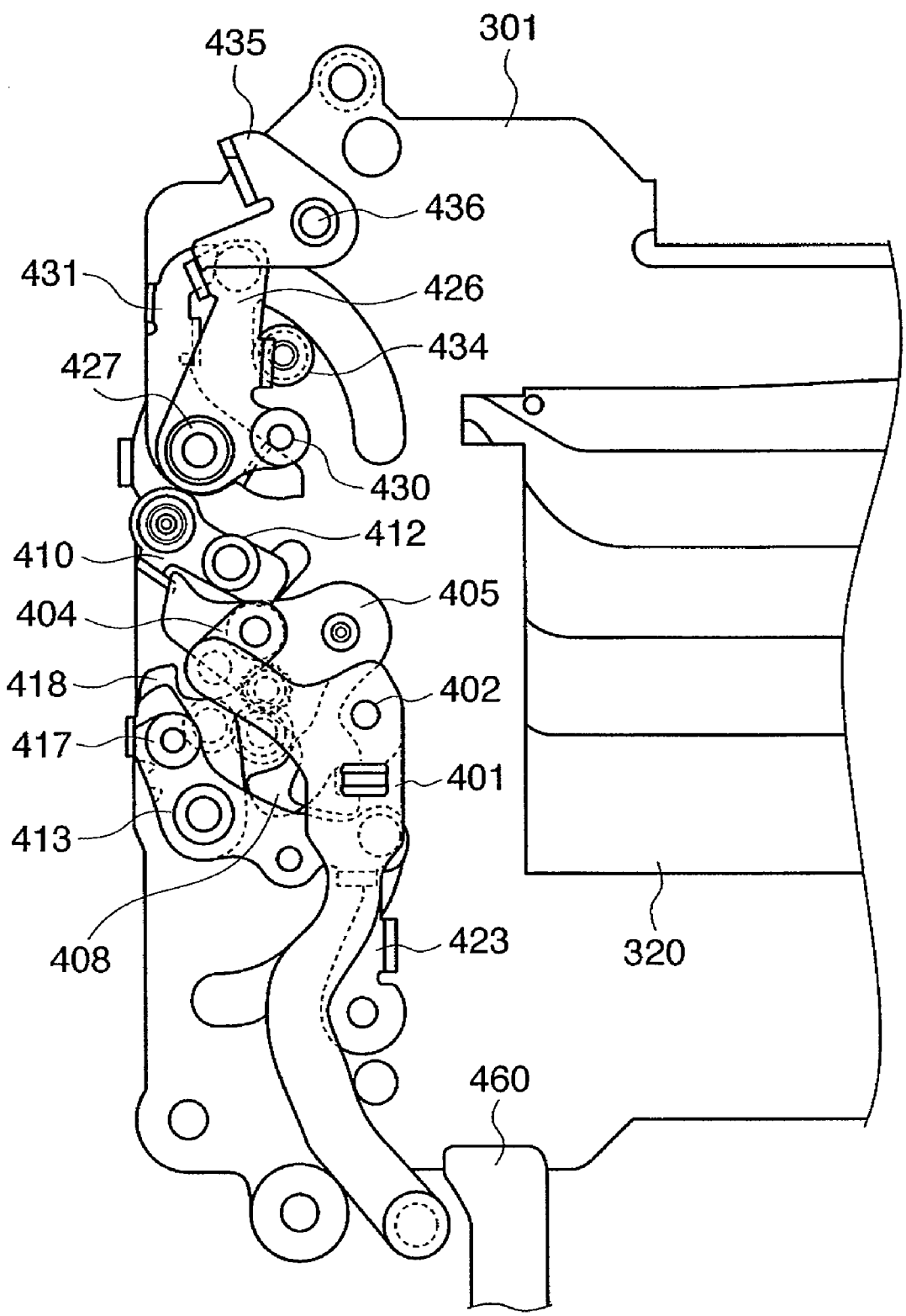
FIG. 19 is a main part plan view of the focal plane shutter.
Figure 20:
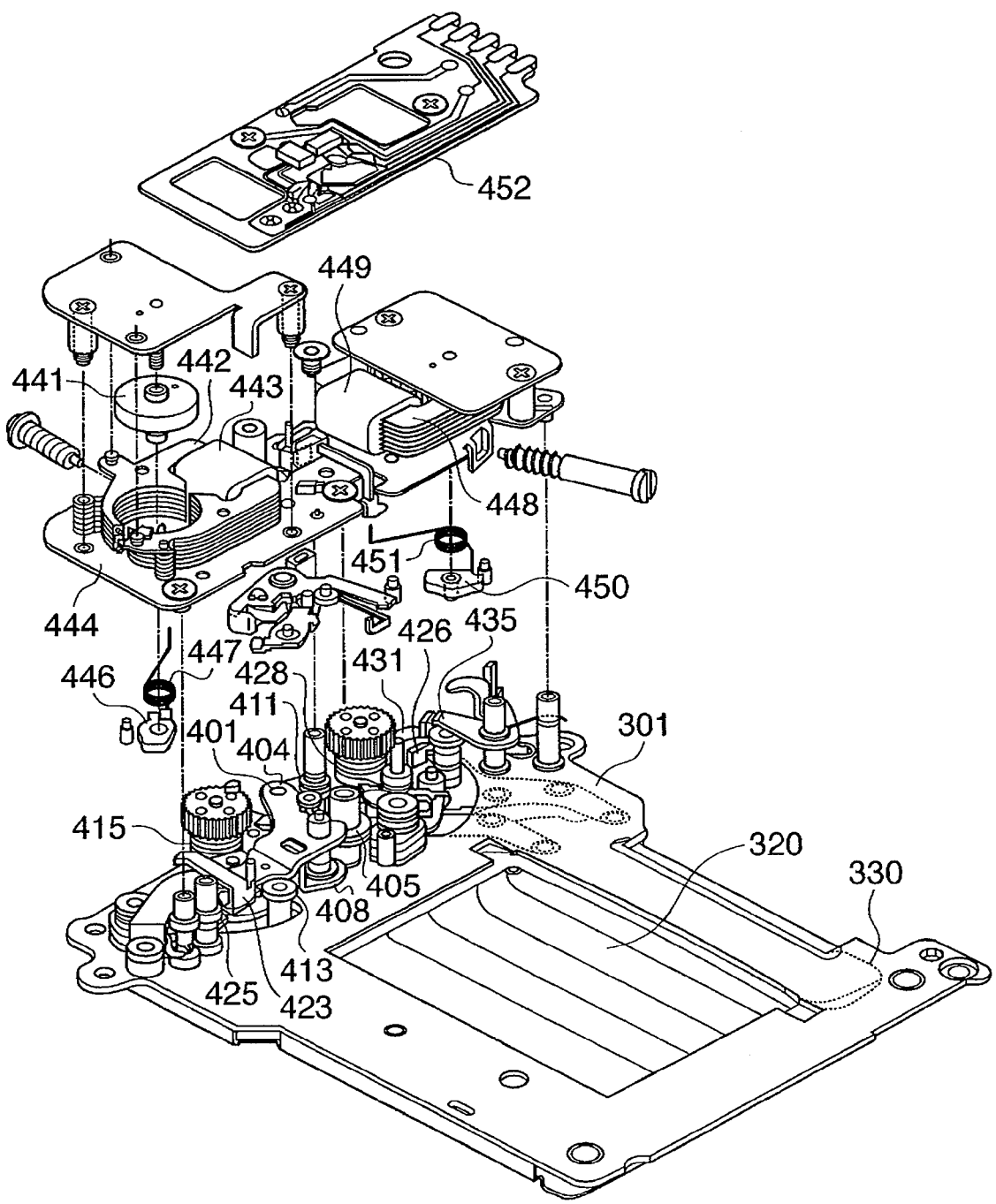
FIG. 20 is an overall exploded perspective view of the focal plane shutter.

FIG. 13 is a drive mechanism main part plan view showing a charge completion state of the focal plane shutter 122. FIG. 14 is a mechanism main plan view showing a state in which a leading blade unit 320 that comprises shutter blades serving as a first shading member and a trailing blade unit 330 that comprises shutter blades serving as a second shading member are in an exposure completed state (state prior to start of charging). FIG. 15 to FIG. 17 are mechanism main part plan views that illustrate a state during charging. FIG. 18 is a mechanism main part plan view showing an overcharge state in which charging is completed. FIG. 19 is a top view centering on a driving section of the shutter in the charge completion state. FIG. 20 is a perspective view showing the configuration of the shutter overall. As shown in FIG. 19 and FIG. 20, each member is disposed on a shutter base plate 301.

In FIG. 11 and FIG. 12, reference number 301 denotes a base plate (hereunder referred to as "shutter base plate") that has a shutter opening, and reference numeral 301*a* denotes the shutter opening. Reference number 301*b* denotes a long hole for escaping from a movement path of a leading blade driving pin 416 of a leading driving lever (lever that imparts motion energy by a spring force or the like to a leading blade) 413, as described later, that is shown in FIGS. 13 to 19. Reference numeral 301*c* denotes a long hole for escaping from the movement path of a trailing blade driving pin 429 of a trailing driving lever (lever that imparts motion energy by a spring force or the like to a trailing blade) 426, as described later, that is shown in FIGS. 13 to 19.

Reference numeral 302 denotes a leading blade slit-forming blade that has a leading blade slit-forming edge 302*a*. Reference numerals 303 to 305 denote leading blade covering blades, and are referred to, in order, as a first leading blade 303, a second leading blade 304, and a third leading blade 305. Reference numeral 306 denotes a leading blade first arm which is mounted so as to be freely turnable around a shaft 301*d* provided in the shutter base plate 301. The leading blade slit-forming blade 302 is rotatably supported with respect to the first arm 306 by a blanking dowel 308*a* that is provided on the leading edge side of the first arm 306. Reference numeral 306*a* denotes a hole into which the leading blade driving pin 416 of the leading driving lever 413 that is described later is inserted. Motive power is transferred from the leading driving lever 413 on which is provided a rotational shaft 414, described later, that is coaxial with the shaft 301*d* through the hole 306*a*. Reference numeral 307 denotes a leading blade second arm which is mounted so as to be able to swing in a freely rotatable manner around a shaft 301*e* provided in the shutter base plate 301. The leading blade slit-forming blade 302 is rotatably supported with respect to the second arm 307 by a blanking dowel 309*a* that is provided on the leading edge side of the second arm 307. Thus, a parallel link is formed by the leading blade slit-forming blade 302 and the leading blade first arm 306 and the leading blade second arm 307. Similarly, the first leading blade 303, the second leading blade 304, and the third leading blade 305 are rotatably supported by blanking dowels 308*b* and 309*b*, 308*c* and 309*c*, and 308*d* and 309*d*, respectively, in the intermediate parts of the leading blade first arm 306 and the leading blade second arm 307. Parallel links are thereby formed. In this manner, the leading blade unit 320 that is a first shading member is constituted by the members denoted by reference numerals 302 to 309.

The trailing blades are configured in the same manner as the leading blades. In FIG. 12 etc., reference numeral 310 denotes a trailing blade slit-forming blade and reference numeral 310*a* denotes a trailing blade slit-forming edge. Reference numerals 311 to 313 denote trailing blade covering blades that are referred to, in order, as a first trailing blade 311, a second trailing blade 312, and a third trailing blade 313. Reference numeral 314 denotes a trailing blade first arm which is mounted to be freely turnable around a shaft 301*f* provided in the shutter base plate 301. The trailing blade slit-forming blade 310 is rotatably supported with respect to the first arm 314 by a blanking dowel 316*a* that is provided on the leading edge side of the first arm 314. Reference numeral 314*a* denotes a hole into which the trailing blade driving pin 429 of the trailing driving lever 426 that is described later is inserted. Motive power is transferred from the trailing driving lever 426 on which is provided a rotational shaft 427, described later, that is coaxial with the shaft 301*f* through the hole 314*a*. Reference numeral 315 denotes a trailing blade second arm which is mounted to freely turnable around a shaft 301*g* provided in the shutter base plate 301. The trailing blade slit-forming blade 310 is rotatably supported with respect to the second arm 315 by a blanking dowel 317*a* that is provided on the leading edge side of the second arm 315. Thus, a parallel link is formed by the trailing blade slit-forming blade 310 and the trailing blade first arm 314 and the trailing blade second arm 315. Similarly, the first trailing blade 311, the second trailing blade 312, and the third trailing blade 313 are rotatably supported by blanking dowels 316*b* and 317*b*, 316*c* and 317*c*, and 316*d* and 317*d*, respectively, in the intermediate parts of the first arm 314 and the second arm 315 to thereby form parallel links. In this manner, the trailing blade unit 330 that is a second shading member is constituted by the members denoted by reference numerals 310 to 317.

In FIG. 13 to FIG. 20, reference numeral 401 denotes a charge lever as a power transmission member that is arranged to be driven by a power transmission member 460 of the camera main unit 1. The charge lever 401 is supported by a shaft 402 to be able to turn around the shaft 402 and is given an urging force in a counter-clockwise direction by a spring 403. Stoppers (not shown) are arranged to allow the charge lever 401 to turn between a position shown in FIG. 13 and another position shown in FIG. 18. Further, the charge lever 401 has a connection hole 401*a* for allowing the charge lever 401 to turn integrally with a leading sub-charge lever 408 that is described later.

Reference numeral 404 denotes a connection lever that is turnably supported for pivotal movement by the charge lever 401 and a charge cam lever 405 and is arranged to cause the charge cam lever 405 to turn in association with a turn of the charge lever 401. Reference numeral 405 denotes the charge cam lever as a first charge member that is turnably held by a shaft 406. The charge cam lever 405 has a cam part 405*a* that charges a leading blade driving spring 415 by abutting on a roller 417 of the leading driving lever 413 when charging the leading driving lever 413. The charge cam lever 405 also has a cam part 405*b* that charges a trailing blade driving spring 428 by abutting on a roller 430 of the trailing driving lever 426 when charging the trailing driving lever 426. A connection roller 407 which abuts on a trailing sub-charge lever 409 is rotatably supported by the charge cam lever 405.

Reference numeral 408 denotes the leading sub-charge lever which is arranged to turn around the same shaft 402 as the charge lever 401. The leading sub-charge lever 408 has a cam part 408*a* which charges a leading sub-lever 418, described later, that is provided for charging a leading blade auxiliary spring 419. The leading sub-charge lever 408 also has a connection part 408*b* which is connected to the connection hole 401*a* of the charge lever 401 to cause the leading sub-charge lever 408 to turn integrally with the charge lever 401.

Reference numeral 409 denotes the trailing sub-charge lever as a second charge member which is turnably held by a shaft 410 and is given an urging force in the clockwise direction by a spring 411 so as to constantly abut on the connection roller 407. On the trailing sub-charge lever 409, there is rotatably supported a trailing sub-charge lever roller 412 as a third roller which is able to abut on a trailing sub-lever 431. As the trailing sub-charge lever roller 412 abuts on the trailing sub-lever 431 to move the trailing sub-lever 431, a trailing blade auxiliary spring 432, described later, is charged. Reference numeral 413 denotes the leading driving lever as a first driving member which is turnably supported by a shaft 414 and is provided with the leading driving lever roller 417 as a first roller which is able to abut on the cam part 405*a* of the charge cam lever 405. In the leading driving lever 413, there is formed a locked part 413*a* which is arranged to be locked by a leading latch lever 423. The leading driving lever 413 is given an urging force in the clockwise direction by the leading blade driving spring 415, which serves as a first spring. In the state shown in FIG. 13, the leading driving lever 413 is locked by the leading latch lever 423, and the leading blade unit 320 covers an aperture frame of the shutter.

Reference numeral 418 denotes the leading sub-lever that is a fourth driving member which is turnably supported on the same shaft as the leading driving lever 413, and is given an urging force in the clockwise direction by the leading blade auxiliary spring 419, which serves as a fourth spring. In the state shown in FIG. 13, since an abutting part 413*c* of the leading driving lever 413 and an abutting part 418*a* of the leading sub-lever 418 are in contact with each other, the spring force of the leading blade auxiliary spring 419 is applied also to the leading driving lever 413. Reference numeral 418*b* denotes a stopper part that is provided on the leading sub-lever 418, which is arranged to turn integrally with the leading driving lever 413 when the leading driving lever 413 turns. The stopper part 418*b* abuts on a leading stopper 421 which is formed with an elastic member made of rubber or a soft plastic material or the like on a leading stopper shaft 420. The stopper part 418*b* is arranged to bring a clockwise turn of the leading sub-lever 418 to a stop.

Reference numeral 422 denotes a leading sub-lever roller that is rotatably supported by the leading sub-lever 418 and is arranged to impart a force to the leading sub-lever 418 by abutting on the cam part 408*a* of the leading sub-charge lever 408.

Reference numeral 423 denotes the leading latch lever which is turnably supported around a shaft 424 and is given an urging force in the counter-clockwise direction by a spring 425. In the state shown in FIG. 13, any further counter-clockwise turn of the leading latch lever 423 is prevented by an unshown stopper. Reference numeral 423*a* denotes a lock part that is arranged to abut on the locked part 413*a* of the leading driving lever 413 to prevent the leading driving lever 413 from turning in the clockwise direction.

Reference numeral 426 denotes the trailing driving lever that serves as a second driving member which is turnably supported by a shaft 427 and is provided with the trailing driving lever roller 430 as a second roller which is arranged to abut on the cam part 405*b* of the charge cam lever 405. The trailing driving lever 426 is further provided with a locked part 426*a* which is arranged to be locked by a trailing latch lever 435 and is given an urging force in the clockwise direction by the trailing blade driving spring 428, which serves as a second spring. In the state shown in FIG. 13, the trailing driving lever 426 is locked by the trailing latch lever 435, and the trailing blade unit 330 uncovers the aperture frame of the shutter.

Reference numeral 431 denotes the trailing sub-lever as a third driving member. The trailing sub-lever 431 is turnably supported on the same shaft as the trailing driving lever 426 and is given an urging force in the clockwise direction by the trailing blade auxiliary spring 432, which serves as a third spring. In the state shown in FIG. 13, the trailing blade driving pin 429 which is provided on the trailing driving lever 426 is abutting on an abutting part 431*a* of the trailing sub-lever 431 to allow the spring force of the trailing blade auxiliary spring 432 to be exerted also to the trailing driving lever 426. Reference numeral 431*b* denotes a stopper part that is provided on the trailing sub-lever 431 which turns integrally with the trailing driving lever 426 when the trailing driving lever 426 turns. The stopper part 431*b* is arranged to abut on a trailing stopper 434 which is formed by an elastic member made of rubber or a soft plastic material or the like and is provided on a trailing stopper shaft 433. Reference numeral 431*c* denotes a charge cam part that serves as a third cam part and is provided on the trailing sub-lever 431. The charge cam part 431*c* is arranged to abut on the trailing sub-charge lever roller 412 that serves as a third roller and is rotatably supported on the trailing sub-charge lever 409. The trailing sub-lever 431 is charged by a turning motion in the counter-clockwise direction of the trailing sub-charge lever 409.

Reference numeral 435 denotes the trailing latch lever which is turnably supported around a shaft 436 and is given an urging force in the counter-clockwise direction by a spring 437. In the state shown in FIG. 13, any further counter-clockwise turn of the trailing latch lever 435 is prevented by an unshown stopper. Reference numeral 435*a* denotes a lock part that is arranged to abut on the locked part 426*a* of the trailing driving lever 426 to prevent the trailing driving lever 426 from turning in the clockwise direction. Reference numeral 441 denotes a magnetized leading blade rotor having a rotational shaft on which is mounted a leading blade hammer 446 that is arranged to abut on the leading latch lever 423. Reference numeral 442 denotes a leading blade stator that is disposed on a base member 444. Reference numeral 443 denotes a leading blade coil that is wound around a part of the leading blade stator 442.

Reference numeral 447 denotes a return spring that is arranged to urge the leading blade rotor 441 and the leading blade hammer 446 to move in a predetermined direction.

While the above described electromagnetic driving device serves to start the running of the leading blade unit 320, the running of the trailing blade unit 330 is started by a similar operation being performed by a trailing blade rotor (not shown), a trailing blade stator 448, a trailing blade coil 449, a return spring 451, and a trailing blade hammer 450 which is arranged to abut on the trailing latch lever 435. Reference numeral 452 denotes a printed circuit board which is connected to the leading blade coil 443 and the trailing blade coil 449 to allow these coils to be energized by a power supply from the camera main unit 1.

Upon the switch SW2 being turned on when the photographer depresses the shutter button 7 to perform photographing, the MPU 100 receives an instruction to start photographing. The MPU 100 starts driving control of the focal plane shutter 122 by the shutter control unit 104.

When a current is passed to the leading blade coil 443 based on an instruction from the shutter control unit 104, a magnetic field is generated at the leading blade stator 442 and the leading blade rotor 441 rotates against the urging force of the return spring 447. The rotation of the leading blade rotor 441 causes the leading blade hammer 446 to abut on the leading latch lever 423 to move the leading latch lever 423, and thereby releases the leading driving lever 413 from a latched state. Thereafter, the leading blade unit 320 begins to travel as a result of the spring forces of the leading blade driving spring 415 and the leading blade auxiliary spring 419.

When the current to the leading blade coil 443 is cut off based on an instruction from the shutter control unit 104, the leading blade rotor 441 and the leading blade hammer 446 are returned to predetermined positions by the urging force of the return spring 447.

When a current is passed to the trailing blade coil 449 after the lapse of a predetermined period of time from the commencement of travel of the leading blade unit 320, the trailing blade rotor which is not shown rotates to cause the trailing blade hammer 450 to abut on the trailing latch lever 435 to move the trailing latch lever 435. As a result, the trailing driving lever 426 is released from a latched state. Thereafter, the trailing blade unit 330 begins to travel as a result of the spring forces of the trailing blade driving spring 428 and the trailing blade auxiliary spring 432.

The shutter is thus arranged to independently perform release actions with the leading blade unit 320 and the trailing blade unit 330 by means of a plurality of electromagnetic driving devices as described above.

When the shutter is in the photography-enabled standby state shown in FIG. 13, power is applied at apposite timing to the aforementioned coils 443 and 449, respectively, of the respective electromagnetic devices based on an instruction from the shutter control unit 104. Thereupon, the coils 443 and 449 rotate the hammers 446 and 450, respectively, causing the leading latch lever 423 and the trailing latch lever 435 to rotate clockwise so that the leading driving lever 413 and the trailing driving lever 426 are sequentially released from a latched state. Subsequently, first the leading driving lever 413 and the leading sub-lever 418 integrally driven by the urging forces of the leading blade driving spring 415 and the leading blade auxiliary spring 419 to cause the leading blade unit 320 to move from a closed position to an open position via a leading blade driving pin 416. While the movement of the leading blade unit 320 is in process, the stopper part 418b of the leading sub-lever 418 comes to abut on the leading stopper 421 to reduce noise and soften an impact before the stopper part 418b finally abuts on the leading stopper shaft 420 to accurately define the operating range of the leading blade auxiliary spring 419. The urging force of the leading blade auxiliary spring 419 onto the leading driving lever 413 is thus removed to allow the leading driving lever 413 to be driven solely by the leading blade driving spring 415 to a stopper (not shown) arranged to define the open position.

Subsequently, the trailing driving lever 426 and the trailing sub-lever 431 are integrally driven by the urging forces of the trailing blade driving spring 428 and the trailing blade auxiliary spring 432 to cause unshown trailing blades to move from an open position to a closed position via a trailing blade driving pin 429. While the movement of the trailing blades is in process, the stopper part 431b of the trailing sub-lever 431 comes to abut on the trailing stopper 434 to reduce noise and soften an impact before the stopper part 431b finally abuts on the trailing stopper shaft 433 to accurately define the operating range of the trailing blade auxiliary spring 432. The urging force of the trailing blade auxiliary spring 432 onto the trailing driving lever 426 is thus removed to allow the trailing driving lever 426 to be driven solely by the trailing blade driving spring 428 to a stopper (not shown) arranged to define the closed position, whereby an exposure operation (photographing operation) is completed and the shutter is brought to the state shown in FIG. 14.

When the charge lever 401 is turned in the clockwise direction so as to bring the shutter into a photography-enabled standby state from the state shown in FIG. 14 (state immediately after completion of photographing), the charge cam lever 405 is also turned in the clockwise direction via the connection lever 404. The clockwise turn of the charge cam lever 405 causes the cam part 405a to abut on the leading driving lever roller 417 to turn the leading driving lever 413 in the counter-clockwise direction. As a result, the leading blade driving spring 415 starts to be charged and the leading blade unit 320 begins to move toward the closed position (state shown in FIG. 15).

When the charge lever 401 is turned to a slight extent from the state shown in FIG. 15, the leading sub-charge lever 408 that is integrally connected to the charge lever 401 turns in the clockwise direction to bring the cam part 408a into abutment with the leading sub-lever roller 422, thereby causing the leading sub-lever 418 to turn in the counter-clockwise direction. By the counter-clockwise turning of the leading sub-lever 418, the leading blade auxiliary spring 419 starts to be charged.

Substantially simultaneously therewith, the trailing sub-charge lever 409 that is in abutment with the connection roller 407 is turned in the counter-clockwise direction. The trailing sub-charge lever roller 412 provided on the trailing sub-charge lever 409 comes into abutment with a charge cam 431c to cause the trailing sub-lever 431 to start to turn in the counter-clockwise direction. Thus, the trailing blade auxiliary spring 432 starts to be charged.

Specifically, the leading blade driving spring 415, the leading blade auxiliary spring 419 and the trailing blade auxiliary spring 432 start to be charged at substantially the same time (state shown in FIG. 16).

When the charge lever 401 is turned further, the cam part 405b of the charge cam lever 405 abuts on the trailing driving lever roller 430 provided on the trailing driving lever 426 to cause the trailing driving lever 426 to turn counter-clockwise. This turning motion of the trailing driving lever 426 causes the trailing blade driving spring 428 to start charging (state shown in FIG. 17).

It is to be noted that since the present embodiment is arranged to return the leading blade unit 320 and the trailing blade unit 330 to their ready-for-photographing positions while keeping the leading blade unit 320 and the trailing blade unit 330 constantly in a state of partly overlapping each other to prevent incorrect exposure during a charging operation, the trailing driving lever 426 starts to turn after the leading driving lever 413 has started to turn. Therefore, the trailing blade driving spring 428 starts to be charged after the start of charging of the leading blade driving spring 415, the leading blade auxiliary spring 419 and the trailing blade auxiliary spring 432.

FIG. 18 shows the overcharged state in which the charge lever 401 is brought in abutment with a stopper (not shown) and turned in the clockwise direction to the greatest extent. In the process of changing from the state of FIG. 17 to the state of FIG. 18, the locked part 413a of the leading driving lever 413 moves over the lock part 423a of the leading latch lever 423. At this time, the leading blade unit 320 and the trailing blade unit 330 are both driven to a charged position that is slightly further than charge completion state shown in FIG. 13. Thereafter, by the spring forces of the leading blade driving spring 415 and the leading blade auxiliary spring 419, and the trailing blade driving spring 428 and the trailing blade auxiliary spring 432, the leading blade unit 320 and the trailing blade unit 330 are instantly returned to the charge completion state at a speed that is equivalent to that at the time of exposure driving of the leading blade unit 320 and the trailing blade unit 330.

Meanwhile, the locked part 426a of the trailing driving lever 426 also moves over the lock part 435a of the trailing latch lever 435. Accordingly, even if the clockwise turning of the charge lever 401 is cancelled, the leading driving lever 413 and the trailing driving lever 426 respectively enter a state in which a turn in the clockwise direction can be locked.

Thereafter, when the clockwise turning of the charge lever 401 is cancelled, the charge lever 401 turns in the counter-clockwise direction together with the charge cam lever 405 and the leading sub-charge lever 408 via the connection lever 404 under the spring force of the spring 403. Further, the spring 411 causes the trailing sub-charge lever 409 to turn in the clockwise direction to return the shutter to the state shown in FIG. 13 in which charging is completed.

At this time, when the leading driving lever 413 is brought into engagement with the leading latch lever 423, the abutting part 418a of the leading sub-lever 418 is brought into abutment with the abutting part 413c by the urging force of the leading blade auxiliary spring 419, whereby the leading sub-lever 418 is brought into engagement with the leading driving lever 413.

Meanwhile, when the trailing driving lever 426 is brought into engagement with the trailing latch lever 435, the abutting part 431a of the trailing sub-lever 431 is brought into abutment with the trailing blade driving pin 429 of the trailing driving lever 426 by the urging force of the trailing blade auxiliary spring 432, whereby the trailing sub-lever 431 is brought into engagement with the trailing driving lever 426.

In this case, in the charge completion state shown in FIG. 13, the charge lever 401 is further charged by the power transmission member 460 that is one part of the shutter charge driving unit 103 of the camera main unit 1 (hereunder, referred to as a "blank charge operation"). Thereupon, unlike the aforementioned charging operation after completion of photographing, since the various springs and levers are charged and in a locked state, only the overcharge operation shown in FIG. 18 is performed. In the overcharge operation shown in FIG. 18, as described in the foregoing the leading blade unit 320 and the trailing blade unit 330 are both driven to a charged position that is slightly further than the charge completion state shown in FIG. 13. Thereafter, by the spring forces of the leading blade driving spring 415 and the leading blade auxiliary spring 419, and the trailing blade driving spring 428 and the trailing blade auxiliary spring 432, the leading blade unit 320 and the trailing blade unit 330 are instantly returned to the charge completion state at a speed that is equivalent to that at the time of exposure driving. As a result, an impact force is applied to the leading blade unit 320 and the trailing blade unit 330. Accordingly, by performing the above described blank charge operation a plurality of times at a high speed, the leading blade unit 320 and the trailing blade unit 330 are repeatedly driven by a slight amount. Thus, since an impact force is applied to the leading blade unit 320 and the trailing blade unit 330 and they are also vibrated by the blank charge operation, the leading blade unit 320 and the trailing blade unit 330 perform a vibrating action.

Thus, according to the present embodiment, a configuration is adopted in which the leading blade unit 320 is driven with the leading blade driving spring 415 and the leading blade auxiliary spring 419, and the trailing blade unit 330 is driven with the trailing blade driving spring 428 and the trailing blade auxiliary spring 432. Further, the configuration is such that the urging forces of the leading blade auxiliary spring 419 and the trailing blade auxiliary spring 432 only act at initial stage of driving the respective blades. Therefore, a strong spring force (force of leading blade driving spring 415 + leading blade auxiliary spring 419, and force of trailing blade driving spring 428 + trailing blade auxiliary spring 432) can be used at the start time of the blades to cause the blades to reach a desired curtain speed in a short time. In addition, since a large accelerating force is unnecessary after reaching a predetermined curtain speed since an inertial force also acts, the curtain speed can be maintained even with a comparatively weak spring force (force of leading blade driving spring 415 and trailing blade driving spring 428).

This is also preferable in terms of maintaining the curtain speed at a constant speed, and furthermore, in comparison with a case of driving a trailing curtain with one spring, deceleration and stopping can be performed with a smaller force.

The leading blade auxiliary spring 419 that has a spring force greater than the spring force of the leading blade driving spring 415, and the trailing blade auxiliary spring 432 that has a spring force greater than the spring force of the trailing blade driving spring 428 are charged using a region that is larger than an action region at the time of an exposure operation. It is therefore possible to disperse energy and the lower a peak of a force required for charging.

The leading blade auxiliary spring 419 and the trailing blade auxiliary spring 432 are charged using substantially the entire region of the charge region of the leading blade driving spring 415. It is therefore possible to reduce the peak of the overall charging force required to charge all the springs, and to make the overall charging force inside the charging region uniform.

In this connection, the operating angles of the leading sub-lever 418 (leading blade auxiliary spring 419) and the trailing sub-lever 431 (trailing blade auxiliary spring 432) are set so that an urging force is not allowed to act in a range of from approximately 15° to 45° from their respective latch engagement positions. Although a favorable acceleration performance can be obtained by adopting this configuration, a configuration may also be adopted in which the leading blade auxiliary spring 419 and the trailing blade auxiliary spring 432 apply an urging force to the entire shutter operation region.

Further, according to the present embodiment the charge lever 401 turns the charge cam lever 405 in the clockwise direction via the connection lever 404 to performing charging. However, it is also possible to directly turn the charge cam lever 405 in the clockwise direction with a member that charges driving of a mirror unit or the like.

According to the present embodiment, for convenience an example has been described in which the start of charging of the leading blade driving spring 415 is slightly ahead of the start of charging of the leading blade auxiliary spring 419. However, this is not intended to limit the present invention, and since the charge torque is more uniformly distributed inside the charge region when charging of the leading blade driving spring 415 and the leading blade auxiliary spring 419 is started simultaneously, the charging effectiveness can be enhanced even further.

On the other hand, even if charging of the leading blade auxiliary spring 419 starts prior to charging of the leading blade driving spring 415, a sufficient effect can be obtained as long as the charge region of the leading blade auxiliary spring 419 and the charge region of the leading blade driving spring 415 are substantially the same.

A configuration may also be adopted in which the leading sub-charge lever 408 or the trailing sub-charge lever 409 is removed, and the leading blade auxiliary spring 419 or the trailing blade auxiliary spring 432 is charged via the leading driving lever 413 or the trailing driving lever 426.

Next, an operation to remove a foreign substance such as dust that adheres to the surface of the infrared cut-off filter 127 according to the present embodiment is described.

Figure 21A:
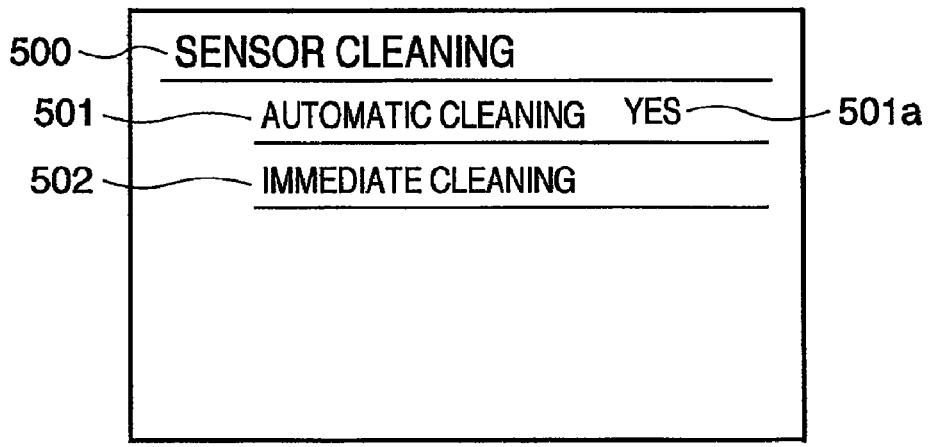
FIGS. 21A to 21C are views showing a backface monitor display when in a cleaning mode.
Figure 21B:
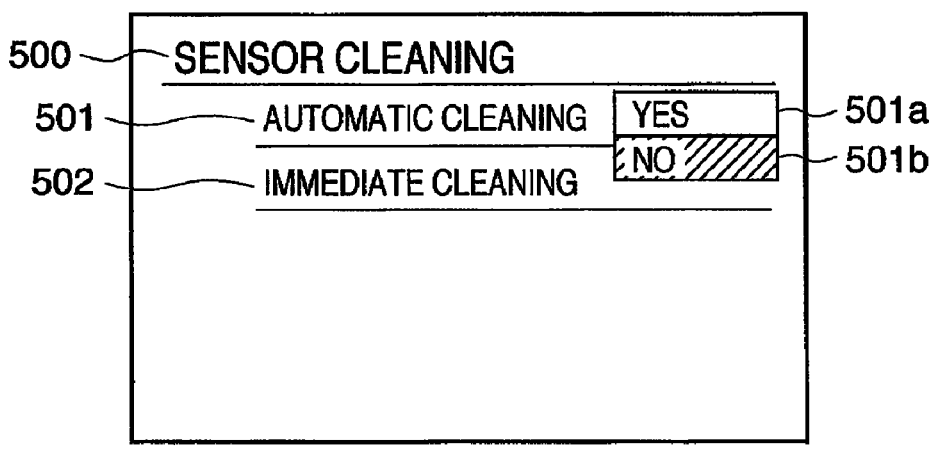
Figure 21C:
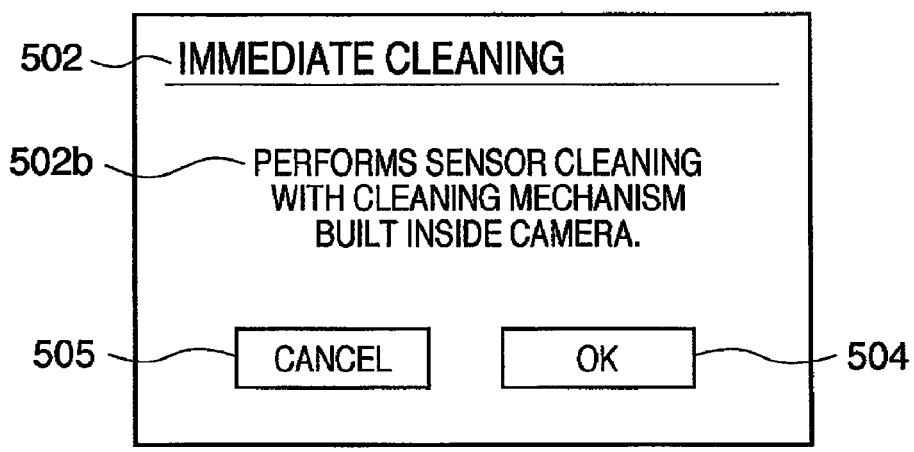
Figure 22:
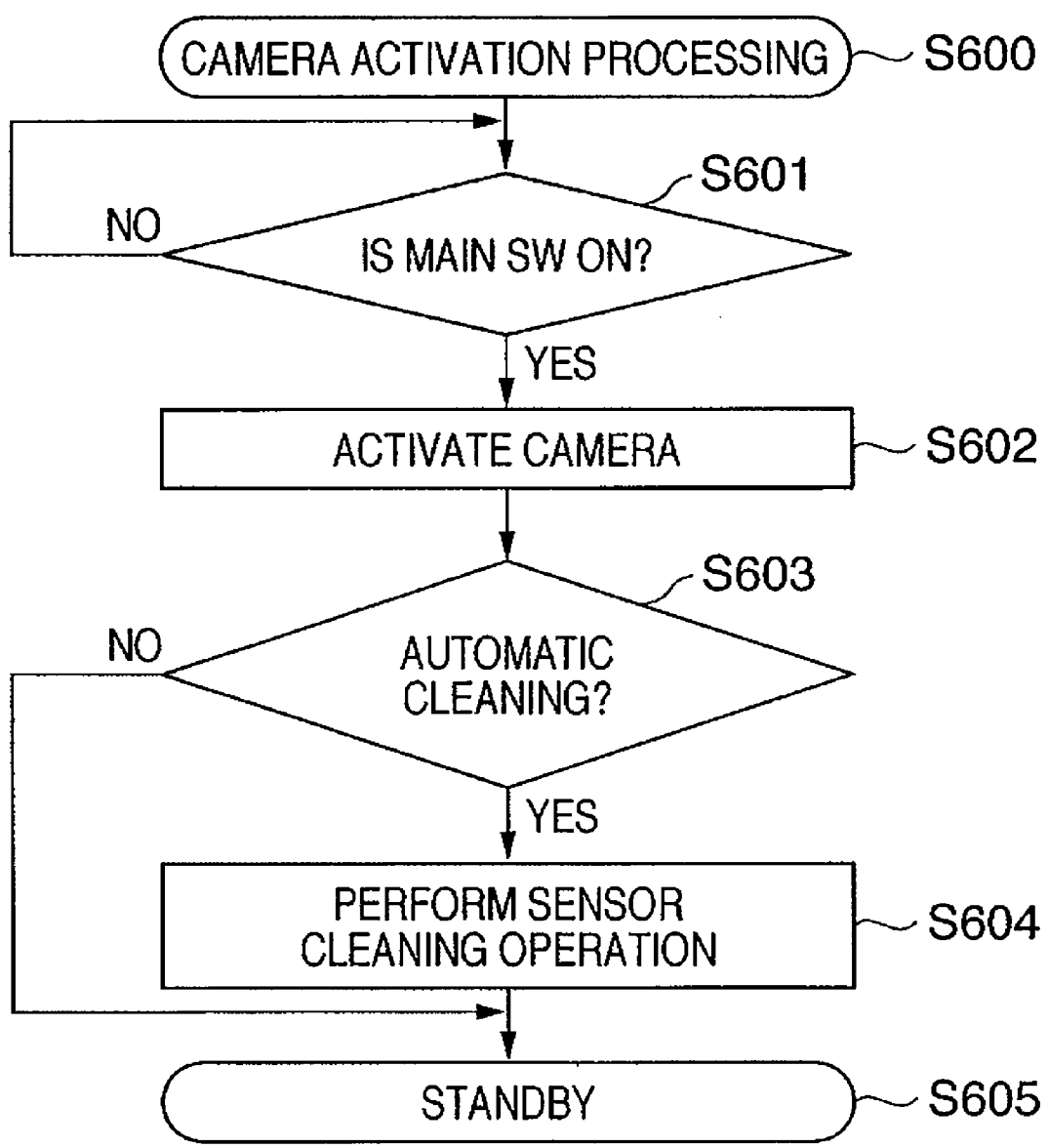
FIG. 22 is a flowchart illustrating sensor cleaning processing according to the first embodiment.
Figure 23:
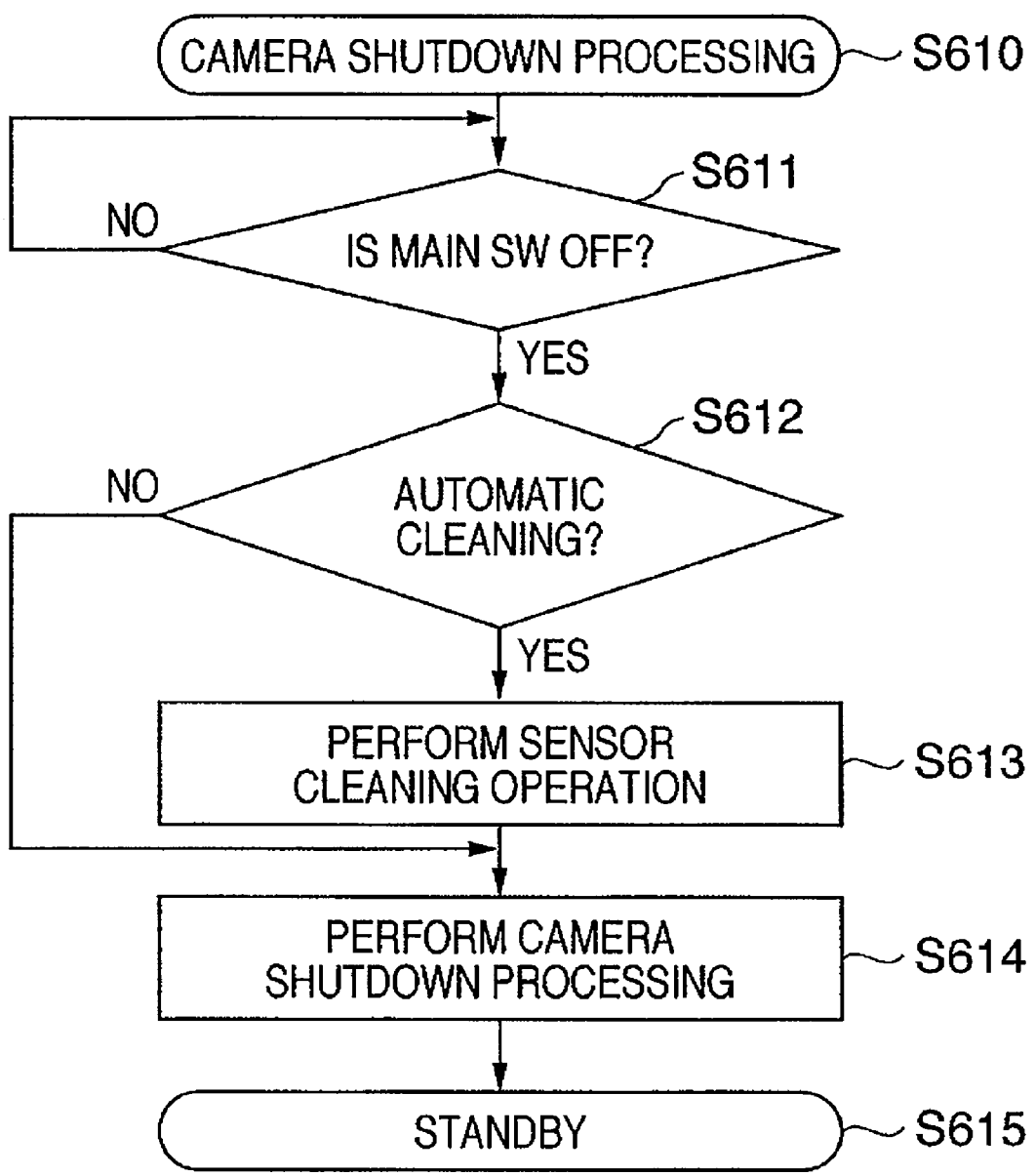
FIG. 23 is a flowchart illustrating a sensor cleaning process according to the first embodiment.

FIGS. 21A to 21C are views that illustrate displays on the backface monitor 19 when the camera main unit 1 is switched to a cleaning mode state by depression of the menu button 24. FIG. 22 to FIG. 23 are views that illustrate the flow of a sensor cleaning process in the cleaning mode. FIG. 25 is a view that illustrates the driving sequence of the piezo-electric element 129 and the shutter during a sensor cleaning process. FIG. 26 is a view illustrating a conceptual diagram for a time of dust removal during a sensor cleaning process.

When the camera main unit 1 is switched to a cleaning mode state, a sensor cleaning display is displayed on the backface monitor 19 (FIG. 21A). In the cleaning mode of the present embodiment, "automatic cleaning" 501 and "immediate cleaning" 502 can be selected on the screen for sensor cleaning 500. "Automatic cleaning" 501 refers to a sensor cleaning process performed according to only a first vibration mode that is described later. "Immediate cleaning" 502 refers to a sensor cleaning process that combines use of the first vibration mode that is described later and a second vibration mode that is described later.

According to the present embodiment, when "automatic cleaning" 501 is selected the options "Yes" 501a and "No" 501b become available for selection on a sub-menu. In FIG. 21B, since "Yes" is selected for automatic cleaning, "No" 501b is displayed in a grayed-out condition. When "Yes" 501a is set for "automatic cleaning" 501, in the camera according to the present embodiment a sensor cleaning process is started in response to operations to switch the main switch 23 that is the power source switch from ON→OFF and from OFF→ON.

FIG. 22 and FIG. 23 are flowcharts illustrating the flow of operations when implementing a sensor cleaning process in response to operations to switch the main switch 23 from ON→OFF and from OFF→ON.

In FIG. 22, when the photographer turns the main switch 23 of the camera main unit 1 from OFF→ON to perform processing to activate the camera at step S600, a determination is made at step S601 as to whether or not the main switch 23 has been turned on. When the main switch 23 has been turned on, at step S602 the camera main unit 1 starts a power supply to perform activation processing of the camera. At step S602 the camera main unit 1 is activated, and at step S603 it is determined whether or not "automatic cleaning" 501 is set to "Yes" 501a. When "automatic cleaning" 501 is not set to "Yes" 501a at step S603, the operation advances to step S605 in which the camera enters a standby state as a pre-photographing preparatory operation. When "automatic cleaning" 501 is set as "Yes" 501a at step S603, the operation advances to step S604 to perform a sensor cleaning operation that is described later, and then advances to step S605 in which the camera enters a standby state as a pre-photographing preparatory operation.

In FIG. 23, when the photographer turns the main switch 23 of the camera main unit 1 from ON→OFF to perform camera shutdown processing at step S610, a determination is made at step S611 as to whether or not the main switch 23 has been turned off. When the main switch 23 has been turned off, at step S612 the camera determines whether or not "automatic cleaning" 501 is set to "Yes" 501a. When "automatic cleaning" 501 is not set to "Yes" 501a at step S612, the operation advances to step S614 to perform camera shutdown processing, and then enter a standby state at step S615. When "automatic cleaning" 501 is set to "Yes" 501a at step S612, the operation advances to step S613 to perform a sensor cleaning operation that is described later. Subsequently, the operation advances to step S614 to perform camera shutdown processing, and then enter a standby state at step S615.

The sensor cleaning operation (S604, S613) according to the present embodiment will now be described.

The sensor cleaning operation (S604, S613) in the automatic cleaning is an operation that performs only sensor cleaning using the first vibration mode in which the infrared cut-off filter 127 that is an optical element is vibrated by the piezo-electric elements 129a and 129b.

In the sensor cleaning operation (S604, S613), the power supply circuit 111 supplies power required for the sensor cleaning operation to each part of the camera main unit 1 as necessary. Concurrent therewith, the power supply circuit 111 detects the remaining amount of the battery of the power source 137 and sends the result to the MPU 100. Upon receiving a signal to commence a sensor cleaning operation, the MPU 100 alternately sends driving signals for the aforementioned in-phase driving and opposite-phase driving to the piezo-electric element driving circuit 112. Upon receiving the driving signals from the MPU 100, the piezo-electric element driving circuit 112 generates periodic voltages that induce flexural vibrations in the infrared cut-off filter 127 and alternately repeats in-phase application and opposite-phase application of voltages with respect to the piezo-electric elements 129a and 129b. As a result, the piezo-electric elements 129a and 129b expand and contract in accordance with the voltages that are applied in phase and in opposite phase, so that the infrared cut-off filter 127 is subjected to two kinds of flexural vibration.

When the infrared cut-off filter 127 undergoes the aforementioned flexural vibrations, a foreign substance that is adhered on the infrared cut-off filter 127 is torn away from the infrared cut-off filter 127 by an acceleration velocity generated in a perpendicular direction to the surface by vibration of the infrared cut-off filter 127, and flies off towards the front.

Next, according to the present embodiment, if "immediate cleaning" 502 is selected, the display screen of the backface monitor 19 changes to a display screen for "immediate cleaning" 502 (FIG. 21C). On the display screen for "immediate cleaning" 502 (FIG. 21C) are displayed an explanatory sentence 502b, "OK" 504 and "cancel" 505. On the initial settings screen of the "immediate cleaning" 502 display, "OK" 504 is set to be selectable. If the aforementioned SET button 22 is depressed in this display state, a sensor cleaning operation starts. If the user wants to cancel the "immediate cleaning" 502, after selecting "cancel" 505 using the aforementioned sub-operation dial 20, the user depresses the aforementioned SET button 22. Thereupon, the display changes from the display screen of "immediate cleaning" 502 (FIG. 21C) to the display screen of sensor cleaning (FIG. 21A).

The operation of "immediate cleaning" 502 that is a sensor cleaning process of the present embodiment will now be described using FIG. 24, FIG. 25, and FIGS. 26A to 26C.

Figure 24:
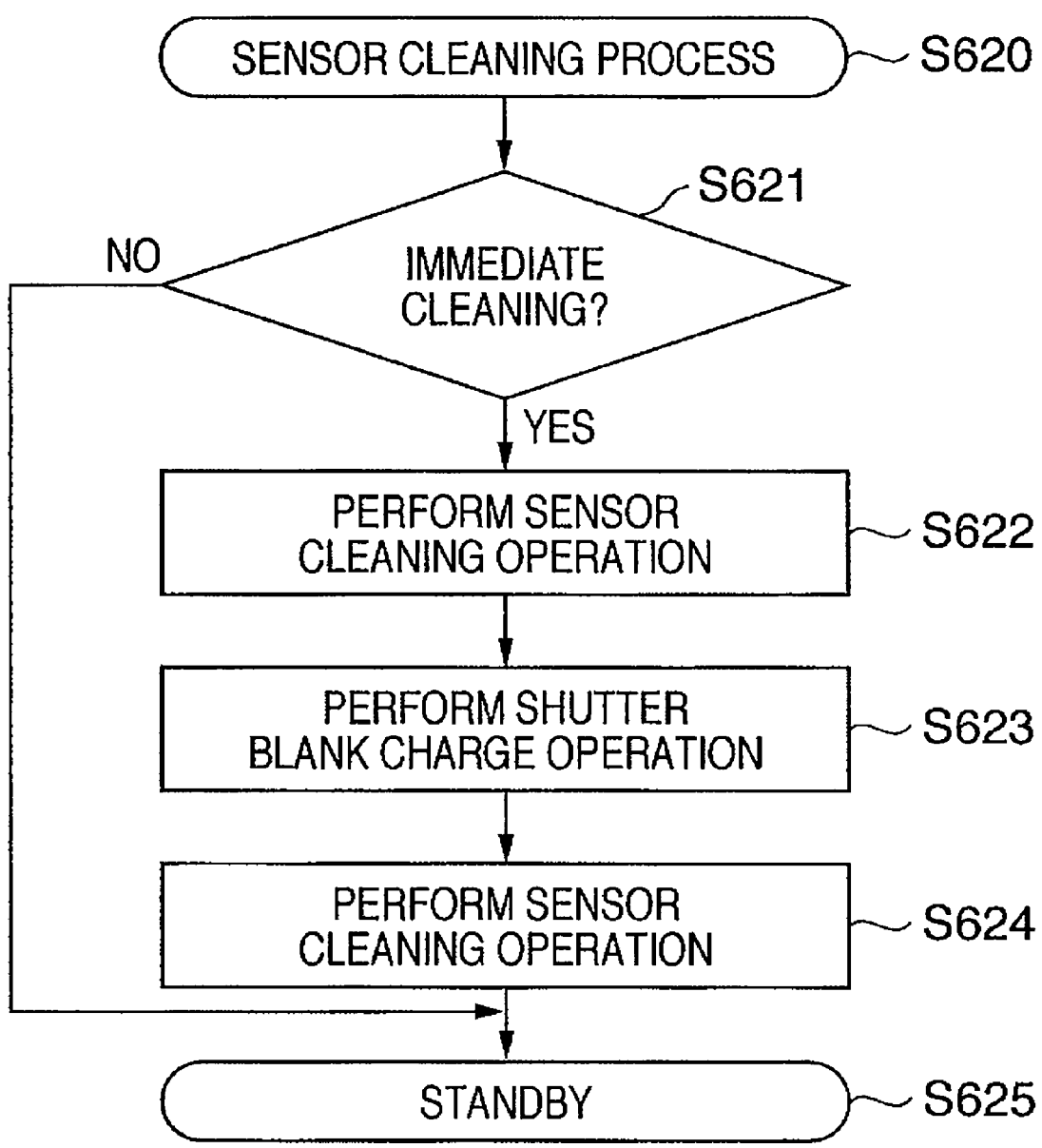
FIG. 24 is a flowchart illustrating a driving sequence of a piezo-electric element and a shutter at a time of the sensor cleaning process.

In FIG. 24, when the photographer causes the display screen of "immediate cleaning" 502 (FIG. 21C) to be displayed at step S620 and starts the sensor cleaning process, the following operations are performed. That is, at step S621 the camera determines whether or not "OK" 504 is selected on the "immediate cleaning" 502 display screen. When "OK" 504 is not selected and "cancel" 505 is selected, the display is switched to the sensor cleaning display screen (FIG. 21A) and the camera enters a standby state at step S625. When "OK" 504 is selected, the processing proceeds to step S622 to start a sensor cleaning operation.

Figure 26C:
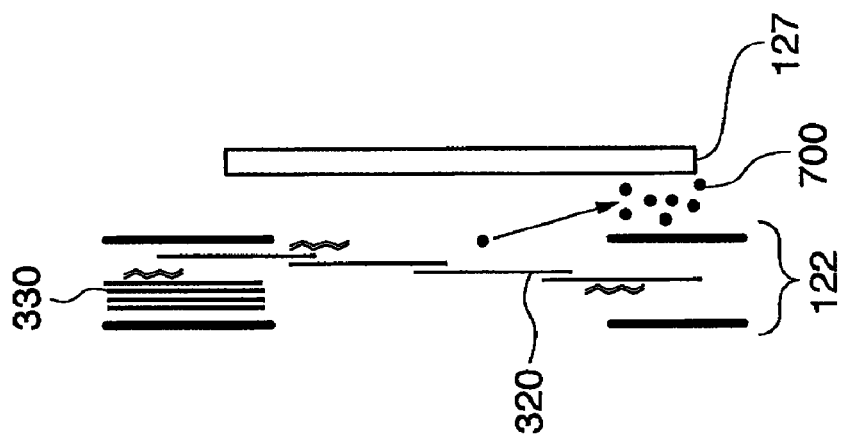
FIGS. 26A to 26C are conceptual diagrams that illustrate dust removal in the sensor cleaning process.
Figure 26B:
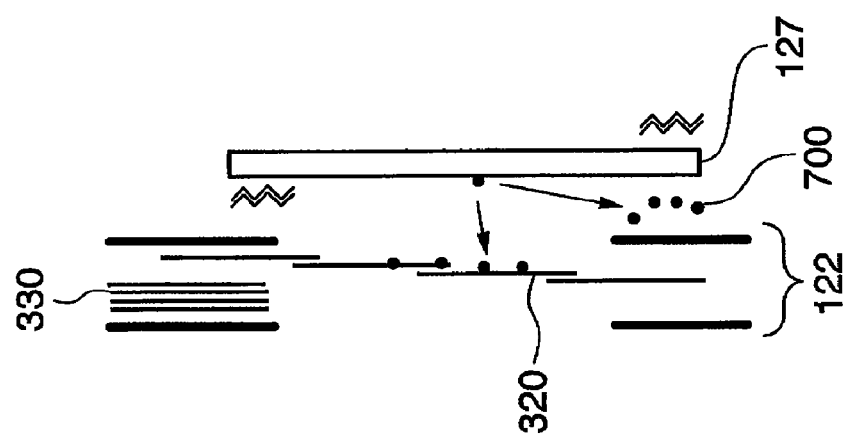
Figure 26A:
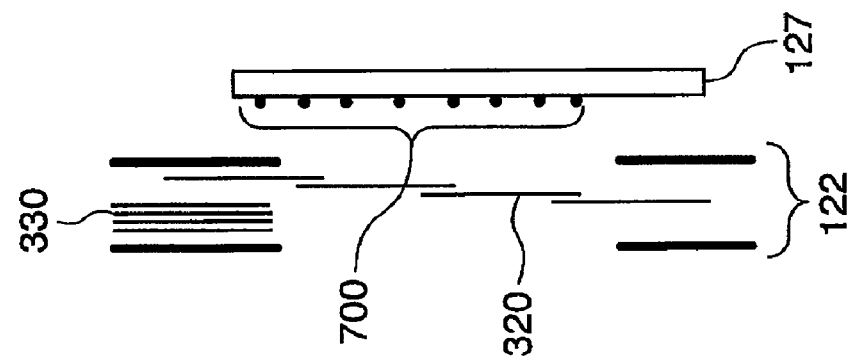

In the sensor cleaning operation of step S622, the same operation is performed as the aforementioned sensor cleaning operation (S604, S613) for "automatic cleaning" 501 that is the first vibration mode. That is, as shown in FIG. 25, after performing in-phase driving of the piezo-electric elements 129a and 129b for a predetermined time, the piezo-electric elements 129a and 129b are subjected to opposite-phase driving for a predetermined time. At this time, when foreign substances 700 are adhered to the surface of the infrared cut-off filter 127 that is an optical element as illustrated in FIG. 26A, the following occurs. That is, as illustrated in FIG.

26B, the foreign substances 700 that are adhered on the infrared cut-off filter 127 are torn away from the infrared cut-off filter 127 by an acceleration velocity generated in a perpendicular direction to the surface by vibration of the infrared cut-off filter 127, and fly off towards the front.

At this time, a large acceleration velocity is obtained for foreign substances that are adhered to places at which there is a large amplitude, and thus these foreign substances fly off away from the infrared cut-off filter 127 and drop down under the force of gravity in the neighborhood of the infrared cut-off filter 127. When the foreign substances drop down freely from the infrared cut-off filter 127 they are subject to influences such as fluctuations in falling patterns caused by asymmetry in the shapes of the foreign substances, minute convection in the vicinity of the infrared cut-off filter 127, or the posture of the image capturing apparatus. In some cases the foreign substances 700 will touch against the infrared cut-off filter 127 while they are dropping down and re-adhere to the infrared cut-off filter 127. There are also cases in which, as a result of flying off away from the infrared cut-off filter 127, the foreign substances 700 adhere to a blade surface of the leading blade unit 320 as the shutter blade of the focal plane shutter 122 that is disposed near the front surface of the infrared cut-off filter 127.

After performing a sensor cleaning operation for a predetermined time at step S622, a shutter blank charge operation is repeated three times for the focal plane shutter 122 at step S623 (FIG. 25). Although according to the present embodiment, a blank charge operation of the focal plane shutter 122 is repeated three times, this is just one example and the present embodiment is not intended to stipulate with respect to the number of repetitions. By performing the blank charge operation of the focal plane shutter 122 a plurality of times at high speed, as described above, the leading blade unit 320 and the trailing blade unit 330 repeat a slight driving action. More specifically, since an impact force is applied by the blank charge operation, the leading blade unit 320 and the trailing blade unit 330 are shaken and vibrate. At this time, foreign substances that fly off from the infrared cut-off filter 127 and adhere to a blade surface of the leading blade unit 320 are torn away from the blade surface of the leading blade unit 320 and dispersed downward as shown in FIG. 26C. At that time, although most of the foreign substances drop down to a space between the infrared cut-off filter 127 and the focal plane shutter 122, in some cases the foreign substances may touch against the infrared cut-off filter 127 on the way down and re-adhere thereto.

In this connection, a shutter blank charge operation (S623) in "immediate cleaning" is a cleaning operation according to a second vibration mode in which the leading blade unit 320 and the trailing blade unit 330 that are shading members are vibrated by a blank charge operation.

After performing a shutter blank charge operation a predetermined number of times at step S623, at step S624 a sensor cleaning operation is performed again (same operation as step S622, FIG. 25). As a result, a foreign substance that touched slightly against the infrared cut-off filter 127 and re-adhered thereto as described above is removed. After performing the sensor cleaning operation for a predetermined time at step S624, the camera switches to the sensor cleaning display screen (FIG. 21A) and enters a standby state at step S625.

As described above, when the photographer intentionally displays the display screen for "immediate cleaning" 502 (FIG. 21C) and executes a sensor cleaning process, the following operations are performed. That is, an operation according to a first vibration mode that causes the infrared cut-off filter 127 to vibrate using the piezo-electric elements 129a and 129b and an operation according to a second vibration mode in which the leading blade unit 320 and the trailing blade unit 330 are vibrated by a shutter blank charge operation are performed.

Accordingly, by simply performing an ON ↔OFF operation of the main switch 23 the photographer can execute an "automatic cleaning" mode that automatically performs sensor cleaning (cleaning according to first vibration mode) without being aware of the cleaning operation. Further, when the photographer wants to intentionally perform sensor cleaning (cleaning that combines use of the first vibration mode and the second vibration mode), the photographer can select the "immediate cleaning" mode by performing a simple operation. It is thus possible to remove foreign substances that adhere to the surface of an optical element such as for example the infrared cut-off filter 127.

Second Embodiment

Figure 27:
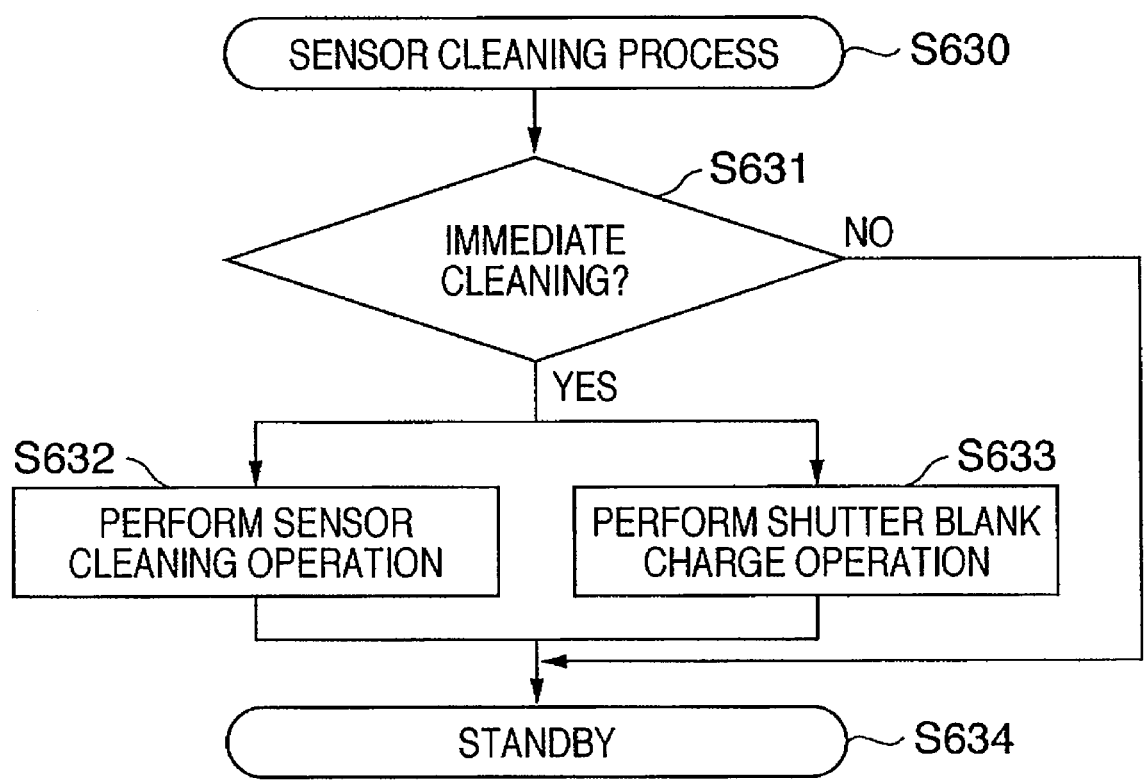
FIG. 27 is a flowchart illustrating a sensor cleaning process according to a second embodiment.
Figure 28:
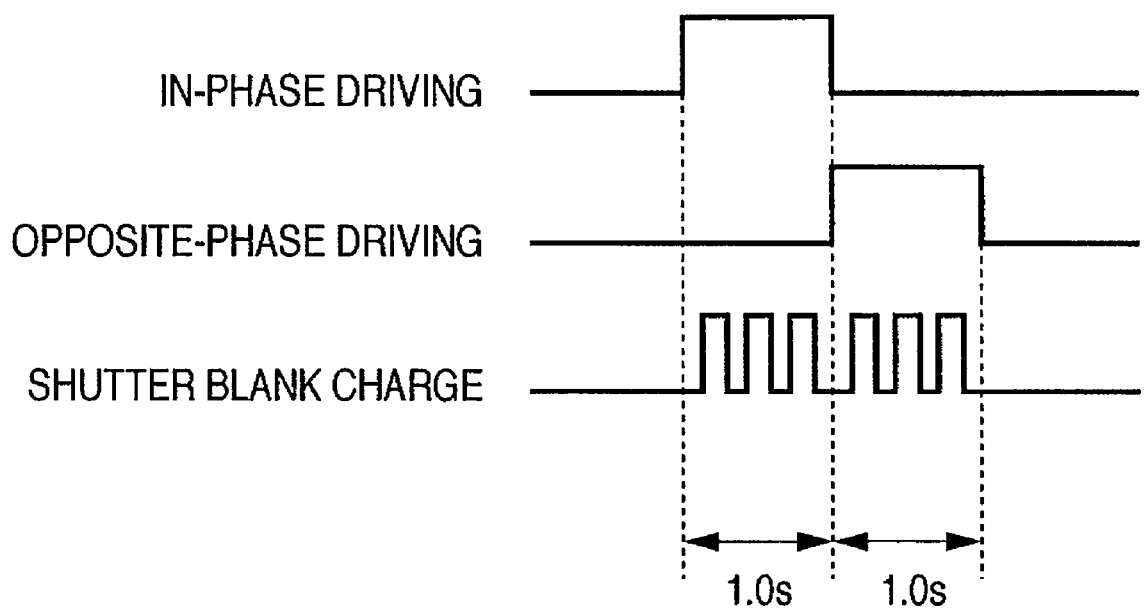
FIG. 28 is a view illustrating driving timing of a piezo-electric element and a shutter at a time of the sensor cleaning process according to the second embodiment.
Figure 29:
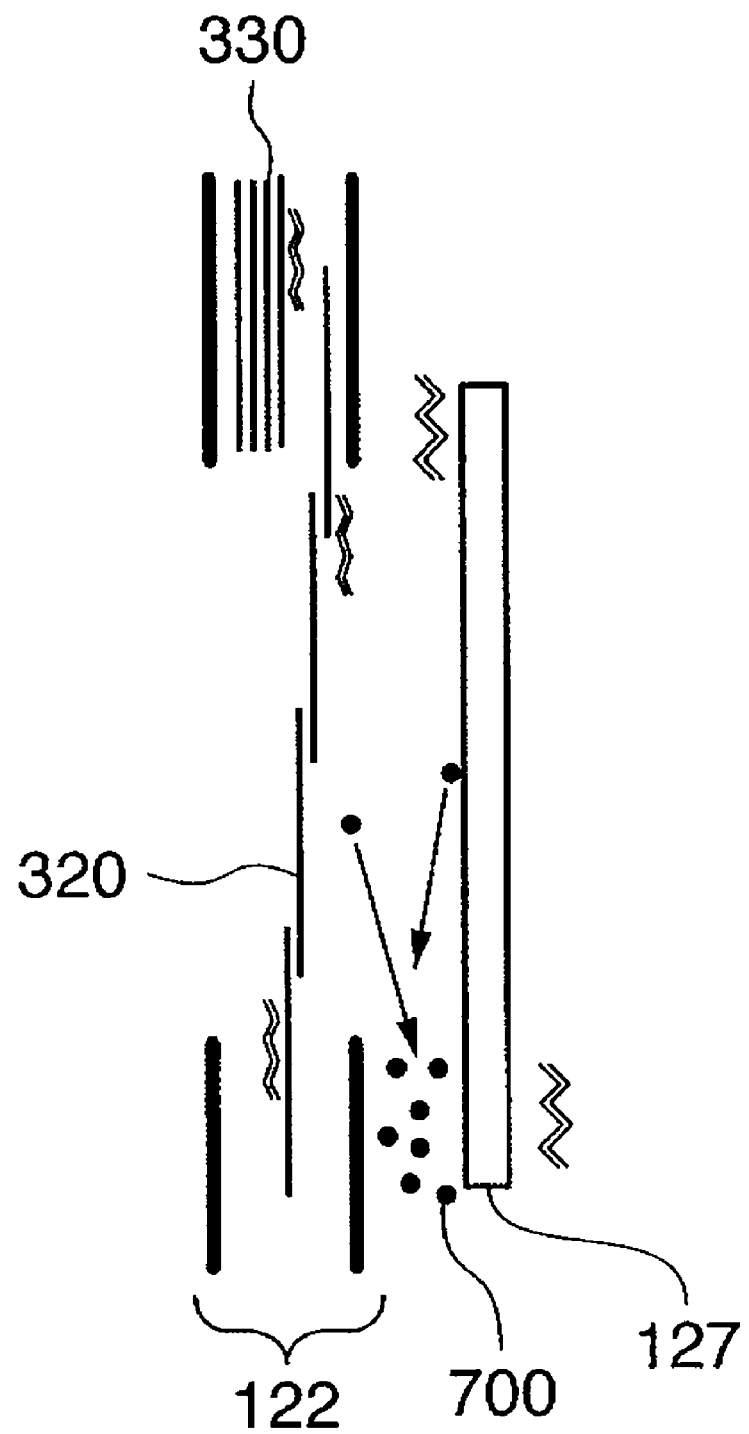
FIG. 29 is a conceptual diagram that illustrates dust removal in the sensor cleaning process according to the second embodiment.

FIG. 27 is a flowchart of a sensor cleaning process according to an "immediate cleaning" mode relating to a second embodiment of the present invention. FIG. 28 is a view that illustrates a driving sequence of the shutter and the piezo-electric elements 129a and 129b at the time of a sensor cleaning process in an "immediate cleaning" mode according to the second embodiment. FIG. 29 is a conceptual diagram that illustrates foreign substance removal in a sensor cleaning process during the "immediate cleaning" mode according to the second embodiment. In the second embodiment, a configuration that is the same as in the first embodiment is denoted by the same reference numerals and a description thereof is omitted.

In FIG. 27, when the photographer causes the display screen of "immediate cleaning" 502 (FIG. 21C) to be displayed at step S630 and starts the sensor cleaning process, the following operations are performed. That is, at step S631 the camera determines whether or not "OK" 504 is selected on the "immediate cleaning" 502 display screen (FIG. 21C). When "OK" 504 is not selected and "cancel" 505 is selected, the display is switched to the sensor cleaning display screen (FIG. 21A) and the camera enters a standby state at step S634. When "OK" 504 is selected, the processing proceeds to step S632 to start a sensor cleaning operation, and at the same time repeats a shutter blank charge operation for the focal plane shutter 122 at step S633.

The sensor cleaning operation at step S632 is the same operation as the sensor cleaning operations (S604, S613) of the aforementioned "automatic cleaning" 501 that is the first vibration mode. That is, as shown in FIG. 28, after performing in-phase driving of the piezo-electric elements 129a and 129b for a predetermined time, the piezo-electric elements 129a and 129b are subjected to opposite-phase driving for a predetermined time. At this time, when foreign substances 700 are adhered to the surface of the infrared cut-off filter 127 that is an optical element as illustrated in FIG. 26A, the following occurs. That is, as illustrated in FIG. 29, the foreign substances that are adhered on the infrared cut-off filter 127 are torn away from the infrared cut-off filter 127 by an acceleration velocity generated in a perpendicular direction to the surface by vibration of the infrared cut-off filter 127, and fly off towards the front. Further, simultaneously thereto a shutter blank charge operation for the focal plane shutter 122 is repeated at step S633. Thereby, foreign substances that adhere to the blade surface of the leading blade unit 320 can also be made to fly off.

By adopting this configuration, it is possible to cause foreign substances that adhere to the surface of the infrared cut-off filter 127 to fly off. In addition, foreign substances that adhere to the blade surface of the leading blade unit 320 can also be made to fly off.

After performing a shutter blank charge operation a predetermined number of times at step S633 at the same time as performing a sensor cleaning operation for a predetermined time at step S632, the camera switches to the sensor cleaning display screen (FIG. 21A) and enters a standby state at step S634.

Third Embodiment

Figure 30:
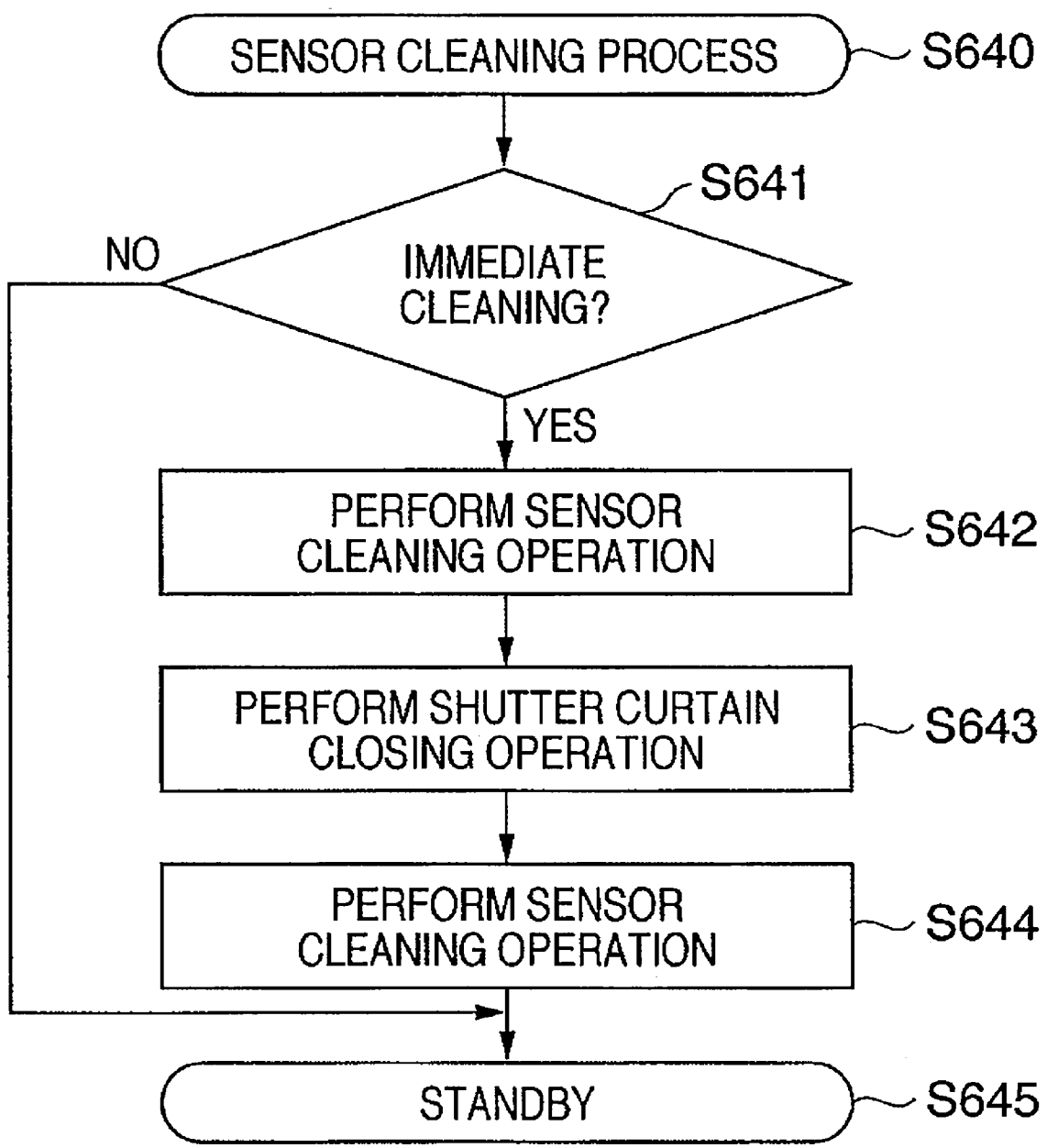
FIG. 30 is a flowchart illustrating a sensor cleaning process according to a third embodiment.

FIG. 30 is a flowchart of a sensor cleaning process according to an "immediate cleaning" mode relating to the third embodiment of the present invention. FIG. 31 is a view that illustrates a driving sequence of the shutter and the piezo-electric elements 129a and 129b at the time of a sensor cleaning process in an "immediate cleaning" mode according to the third embodiment. In the third embodiment, a configuration that is the same as in the first embodiment is denoted by the same reference numerals and a description thereof is omitted.

In FIG. 30, when the photographer causes the display screen of "immediate cleaning" 502 (FIG. 21C) to be displayed at step S640 and starts the sensor cleaning process, the following operations are performed. That is, at step S641 the camera determines whether or not "OK" 504 is selected on the "immediate cleaning" 502 display screen (FIG. 21C). When "OK" 504 is not selected and "cancel" 505 is selected, the display is switched to the sensor cleaning display screen (FIG. 21A) and the camera enters a standby state at step S645. When "OK" 504 is selected, the operation proceeds to step S642 to start a sensor cleaning operation.

The sensor cleaning operation at step S642 is the same operation as the sensor cleaning operations (S604, S613) of the aforementioned "automatic cleaning" 501 that is the first vibration mode. That is, as shown in FIG. 31, after performing in-phase driving of the piezo-electric elements 129a and 129b for a predetermined time, the piezo-electric elements 129a and 129b are subjected to opposite-phase driving for a predetermined time. At this time, when foreign substances 700 are adhered to the surface of the infrared cut-off filter 127 that is an optical element as illustrated in FIG. 26A, the following occurs. That is, as illustrated in FIG. 26B, the foreign substances that are adhered on the infrared cut-off filter 127 are torn away from the infrared cut-off filter 127 by an acceleration velocity generated in a perpendicular direction to the surface by vibration of the infrared cut-off filter 127, and fly off towards the front.

At this time, a large acceleration velocity is obtained for foreign substances that are adhered to places at which there is a large amplitude, and thus these foreign substances fly off away from the infrared cut-off filter 127 and drop down under the force of gravity in the neighborhood of the infrared cut-off filter 127. When the foreign substances drop down freely from the infrared cut-off filter 127 they are subject to influences such as fluctuations in falling patterns caused by asymmetry in the shapes of the foreign substances, minute convection in the vicinity of the infrared cut-off filter 127, or the posture of the image capturing apparatus. Therefore, in some cases the foreign substances touch against the infrared cut-off filter 127 while they are dropping down and re-adhere to the infrared cut-off filter 127. There are also cases in which, as a result of flying off away from the infrared cut-off filter 127, the foreign substances 700 adhere to a blade surface of the leading blade unit 320 as the shutter blade of the focal plane shutter 122 that is disposed near the front surface of the infrared cut-off filter 127.

After performing a sensor cleaning operation for a predetermined time at step S642, a blade driving operation is performed for the focal plane shutter 122 at step S643. As shown in FIG. 31, unlike a normal exposure operation, the leading blade unit 320 is caused to travel after the trailing blade unit 330 of the focal plane shutter 122 is caused to travel by the drive mechanism described in the first embodiment. As a result, driving (curtain closing operation) is performed such that an opening is not formed by the leading blade unit 320 and the trailing blade unit 330. After traveling of the leading blade unit 320 and the trailing blade unit 330, a shutter charge operation that is an operation that returns the leading blade unit 320 and the trailing blade unit 330 to a ready-for-photographing state is again performed.

At this time, foreign substances that fly off from the infrared cut-off filter 127 and adhere to a blade surface of the leading blade unit 320 are torn away from the blade surface by an impact when the leading blade unit 320 travels, and fly off in a downward direction. At that time, although most of the foreign substances drop down to a space between the infrared cut-off filter 127 and the focal plane shutter 122, in some cases the foreign substances may touch against the infrared cut-off filter 127 on the way down and re-adhere thereto.

After performing a blade driving operation for the focal plane shutter 122 at step S643, at step S644 a sensor cleaning operation is performed again (same operation as step S642, FIG. 31). As a result, foreign substances that touched slightly against the infrared cut-off filter 127 and re-adhered thereto as described above are removed. After performing the sensor cleaning operation for a predetermined time at step S644, the camera switches to the sensor cleaning display screen (FIG. 21A) and enters a standby state at step S645.

By adopting this configuration, it is possible to cause foreign substances that adhere to the surface of the infrared cut-off filter 127 to fly off. In addition, it is possible to prevent foreign substances adhering to the blade surface of the leading blade unit 320 that is a shutter blade of the shading member of the focal plane shutter 122 disposed in the vicinity of the front surface of the infrared cut-off filter 127.

It is to be noted that although a case was described above in which a focal plane shutter is used that has a leading curtain and a trailing curtain, the present invention can also be applied to a case using a focal plane shutter that has only either one of a leading curtain and a trailing curtain.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-036813, filed Feb. 16, 2007, which is hereby incorporated by reference herein in its entirety.

What is claimed is:

1. An image capturing apparatus, comprising:
   a photographing optical system;
   an image sensor operable to capture an image of an object formed by the photographing optical system;
   an optical element disposed between said photographing optical system and said image sensor;
   a shutter disposed between said photographing optical system and said optical element and which has one or more shutter curtains that are capable of traveling between an open state and a closed state;

a first vibration unit operable to cause said optical element to vibrate when said one or more shutter curtains are in the closed state;

a second vibration unit operable to cause said shutter to vibrate by moving said one or more shutter curtains while keeping the closed state of said one or more shutter curtains which are in the closed state when said first vibration unit is operated; and a controller configured to control the timing of the operation of said first vibration unit and said second vibration unit.

2. The image capturing apparatus according to claim 1, wherein, said controller controls the first vibration unit to vibrate said optical element before causing said second vibration unit to vibrate said one or more shutter curtains.

3. The image capturing apparatus according to claim 1, wherein:

said shutter comprises a charge unit that charges said one or more shutter curtain to a position prior to traveling in resistance to forces of springs that urge said shutter curtain in a travelling direction; and said second vibration unit causes said shutter curtain to vibrate by releasing said shutter curtain after overcharging said shutter curtain as far as a position that exceeds the position prior to travelling.

4. The image capturing apparatus according to claim 1, further comprising a switch operable to switch between a first mode that performs only an operation in which said optical element is caused to vibrate by said first vibration unit and a second mode that performs both an operation in which said optical element is caused to vibrate by said first vibration unit and an operation in which said one or more shutter curtains are caused to vibrate by said second vibration unit.

* * * * *